(12) United States Patent
Kojima et al.

(10) Patent No.: US 11,205,293 B2
(45) Date of Patent: Dec. 21, 2021

(54) AVATAR DISPLAY SYSTEM IN VIRTUAL SPACE, AVATAR DISPLAY METHOD IN VIRTUAL SPACE, AND COMPUTER PROGRAM

(71) Applicant: DWANGO Co., Ltd., Tokyo (JP)

(72) Inventors: Takashi Kojima, Tokyo (JP); Hiroaki Saito, Tokyo (JP); Shinnosuke Iwaki, Tokyo (JP)

(73) Assignee: DWANGO CO., LTD., Tokyo (JP)

( * ) Notice: Subject to any disclaimer, the term of this patent is extended or adjusted under 35 U.S.C. 154(b) by 0 days.

(21) Appl. No.: 17/258,277

(22) PCT Filed: Oct. 29, 2019

(86) PCT No.: PCT/JP2019/042289
§ 371 (c)(1),
(2) Date: Jan. 6, 2021

(87) PCT Pub. No.: WO2020/090786
PCT Pub. Date: May 7, 2020

(65) Prior Publication Data
US 2021/0248803 A1    Aug. 12, 2021

(30) Foreign Application Priority Data

Oct. 31, 2018 (JP) .............................. JP2018-215065

(51) Int. Cl.
*G06T 13/40* (2011.01)
*G06T 19/00* (2011.01)

(52) U.S. Cl.
CPC .............. *G06T 13/40* (2013.01); *G06T 19/00* (2013.01)

(58) Field of Classification Search
CPC ........ G06T 13/40; G06T 19/00; G06T 19/003
See application file for complete search history.

(56) References Cited

U.S. PATENT DOCUMENTS 5,956,038 A * 9/1999 Rekimoto ............. A63F 13/335
345/419
2003/0084094 A1* 5/2003 Shim ....................... H04L 29/06
709/203

FOREIGN PATENT DOCUMENTS

JP        7-288791 A      10/1995
JP        9-212679 A      8/1997
(Continued)

OTHER PUBLICATIONS

International Search Report dated Jan. 21, 2020 in corresponding application No. PCT/JP2019/042289; 5 pgs.
(Continued)

*Primary Examiner* — Said Broome
(74) *Attorney, Agent, or Firm* — Maier & Maier, PLLC

(57) ABSTRACT

An avatar display system in virtual space, an avatar display method in virtual space, and a computer program in which avatar motion data is thinned out within a certain time due to the circumstances of a system and is intermittently distributed. Accordingly, when avatars try to high-touch with each other, the avatars go too far before the hands touch each other in the transmission of coarse motion data, and thus a natural avatar operation cannot be performed. When avatars are intended to perform an operation with contact, such as a high touch operation between the avatars, as the avatars approach each other, a transmission interval in which data required for rendering avatars such as motion data, or rendered avatar data is transmitted from a server to a client terminal is made smaller, and a more natural avatar contact operation can be performed.

5 Claims, 17 Drawing Sheets

(56) References Cited

FOREIGN PATENT DOCUMENTS

| JP | 2000-306120 A | 11/2000 |
| JP | 2001-160154 A | 6/2001 |
| JP | 2002-216165 A | 8/2002 |
| JP | 2018-032132 A | 3/2018 |

OTHER PUBLICATIONS

Decision to Grant a Patent dated Jun. 12, 2020 in corresponding application No. 2018-215065; 5 pgs.
Decision of Refusal dated Jan. 24, 2020 in corresponding application No. 2018-215065; 2 pgs.
Notice of Reasons for Refusal dated Nov. 1, 2019 in corresponding application No. 2018-215065; 6 pgs.

\* cited by examiner

AVATAR DISPLAY SYSTEM IN VIRTUAL SPACE, AVATAR DISPLAY METHOD IN VIRTUAL SPACE, AND COMPUTER PROGRAM

FIELD

The present disclosure relates to an avatar display system in a virtual space, an avatar display method in a virtual space, and a computer program.

BACKGROUND

Recently, a service for distributing a live content through a network has been widespread as internet live broadcast. In such internet live broadcast, a technology has been proposed in which a distributor appears as a virtual character (an avatar) in a virtual space and an image thereof is distributed as a live content. In such a live content, an image in which the operation of the distributor is synthesized as the operation of the virtual character is distributed by a motion capture technology.

In Patent Document 1 described below, a configuration is disclosed in which a display mode of an avatar is changed in accordance with a distance in a plurality of avatars appearing in a virtual space. Specifically, in a first stage of the furthest distance, a motionless avatar image without an animation operation is drawn, in a second stage of a close distance, the avatar performs only walking animation, in a third stage of a closer distance, the avatar performs gesture operation animation of the upper body, and in a fourth stage of the closest distance, the own real face photo of an avatar operator is inserted into the face portion of the avatar, and thus, in live content distribution of a virtual space in which a plurality of people participate, it is intended to improve attainability by reducing a load on a necessary transmission band, a central processing unit (CPU), or the like.

In addition, in Patent Document 2 described below, a configuration is proposed in which in an image generating system for drawing the movement of the wave but not a substitutional object of a person, as a virtual object using computer graphics (CG), in the case of performing drawing such that a CG drawing object of the wave hits a CG drawing object of the same rock, and then, airborne droplets fly, in a situation in which there are a lot of rocks or waves in the coast, each wave-to-rock collision detection is extremely frequently performed and calculation addition is burdensome, and realtime drawing of the airborne droplets becomes difficult, and thus, the collision detection of the wave with respect to the entire region in which the rocks exist, but not the collision detection of specific wave and rock, is performed, and the calculation addition of the system is reduced, and as a result thereof, CG drawing with reality and no failure is performed.

PATENT DOCUMENT

Patent Document 1: JP-A-2001-160154
Patent Document 2: JP-A-2002-216165

SUMMARY

The number of viewers enjoying a live content in internet live broadcast or the like has increased recently, and in such a live content, it has appeared that not only does the viewer of the live broadcast simply view and enjoy the content, but also the viewer himself/herself is capable of enjoying the content by allowing the own avatar to appear in the live content, that is, in a virtual space that is provided by the live content.

In such a system in which the participation of a viewer avatar can be performed, an avatar having an appearance that is selected or designed by the viewer himself/herself appears in the live content, and as a result thereof, and the avatar is visually recognized by the other viewer viewing the live content, and thus, a sense of satisfaction that is capable of appealing the own existence is obtained. In addition, the inside of the virtual space that is provided by the live content can be seen from the viewpoint of the viewer avatar that is inserted by the viewer, and thus, a sense of immersion increases. Further, in the virtual space, the viewer is capable of enjoying a conversation with a distributor avatar that hosts and distributes the live content or an avatar of the other viewer who is also participating therein, as an avatar, and thus, this also leads to an increase in the sense of immersion with respect to the virtual space.

However, it is considered that the viewer who appears and participates in the live content, in the form of an avatar, wants not only the enjoyment described above such as the enjoyment in which the appearance or the movement of the own avatar is viewed by the other viewer, the enjoyment in which the virtual space of the live content is seen from the viewpoint of the avatar that is operated by the viewer himself/herself, or the enjoyment of having a conversation with the other avatar, but also the enjoyment of an action involving contact between the avatars such as the enjoyment of handshaking with the other avatar and the enjoyment of dancing with the other avatar.

As such an action involving the contact between the avatars, there is no end to the list including high-touch (a Japanese-English word of an operation of putting the palm of the hand up and hitting the palm of the hand of the other person with the own palm, in English expression, an operation of hitting one hand with one hand is referred to as "high five", and an operation of hitting two hands with two hands is referred to as "high ten"), holding hands, fighting sports such as sumo wrestling, wrestling, boxing, and arm wrestling, piggyback ride, three-legged race, hug, tapping a shoulder, pinky swear, sardines-in-the-box, chain tag, and the like, in addition to handshake, dance, or the like, described above.

In particular, holding hands, handshake, or high-touch is convention that is frequently performed in everyday real space and is simply performed by joining or hitting hands, and thus, it is expected that the needs thereof increase as an operation that is performed by the avatars in the virtual space.

On the other hand, for example, at the time of performing handshake, it is necessary for both avatars to stretch forth their own hands and to position the palms of the hands of the avatars to each other, precisely to some extent.

However, in the drawing of various objects and avatars in the virtual space, in particular, in a case where there is a movement in a drawing target, a data transmission rate for drawing is generally suppressed in order to reduce a load on the system, and the movement of the avatar is decimated from the movement of the human body that a person feels in the real space, and is intermittently drawn. For this reason, in the related art, it is difficult to provide a system including the drawing of the avatar in which an action for the avatars to be in contact with each other, such as handshake between the avatars, has no unnaturalness and an excellent operational feeling from the standpoint of operating the avatar.

The invention has been made in consideration of the situations described above, and an object thereof is to provide an avatar display system in a virtual space, an avatar display method in a virtual space, and a computer program for providing a configuration in which when a movement in a virtual space is broadcast as a live content, an action for avatars appearing in the virtual space to be in contact with each other, such as handshake, has no unnaturalness and an excellent operational feeling from the standpoint of operating the avatar.

In order to attain the object described above, the present invention provides an avatar display system in a virtual space, an avatar display method in a virtual space, and a computer program according to 1) to 7) described below.

1)

An avatar display system in a virtual space for attaining computer graphic animation display of an avatar on a display screen of each of a plurality of terminals by allowing users of the plurality of terminals connected through a communication line to share a three-dimensional virtual space, by allowing the avatar symbolizing each of the users to appear in the three-dimensional virtual space, and by distributing (1) position and direction information of each of the avatars in the three-dimensional virtual space or (2) rendered data of each of the avatars in the three-dimensional virtual space to each of the plurality of terminals from a distribution unit, characterized in that the avatar display system in the virtual space further includes a distance information generating unit generating mutual distance information of each of the avatars in the three-dimensional virtual space, and a control unit provided in the avatar display system is configured such that an information amount per unit time of the distribution that is performed by the distribution unit is changed in accordance with the generated mutual distance information.

2)

The avatar display system in the virtual space according to 1), characterized in that at least one of the plurality of terminals includes a selection unit selecting a target avatar for generating the mutual distance information.

3)

The avatar display system in the virtual space according to 1) or 2), characterized in that the control unit controls the information amount such that in a case where a mutual distance of the avatars that is generated is less than a threshold value set in advance, the information amount per unit time of the distribution is increased.

4)

An avatar display method in a virtual space for attaining computer graphic animation display of an avatar on a display screen of each of a plurality of terminals by including a step of allowing users of the plurality of terminals connected through a communication line to share a three-dimensional virtual space, of allowing the avatar symbolizing each of the users to appear in the three-dimensional virtual space, and of allowing a distribution unit to distribute (1) position and direction information of each of the avatars in the three-dimensional virtual space or (2) rendered data of each of the avatars in the three-dimensional virtual space to each of the plurality of terminals, characterized in that the avatar display method in the virtual space further includes a step of allowing a distance information generating unit to generate mutual distance information of each of the avatars in the three-dimensional virtual space and a step of allowing a control unit provided in a system to change an information amount per unit time of the distribution that is executed in the distribution step, in accordance with the generated mutual distance information.

5)

The avatar display method in the virtual space according to 4), characterized in that the avatar display method further includes a step of allowing a selection unit provided in at least one of the plurality of terminals to select a target avatar for generating the mutual distance information.

6)

The avatar display method in the virtual space according to 4) or 5), characterized in that the control unit controls the information amount such that in a case where a mutual distance of the avatars that is generated is less than a threshold value set in advance, the information amount per unit time of the distribution is increased.

7)

A computer program for allowing a computer to execute each of the steps of the avatar display method in the virtual space according to any one of 4) to 6).

DETAILED DESCRIPTION

Hereinafter, an embodiment according to the disclosure will be described. Note that, this embodiment described below is merely an example, various modifications can be made within a range not departing from the gist of the invention, and such modifications are also included in the invention.

[Configuration of Content Distribution and Reception System 1]

Figure 1:
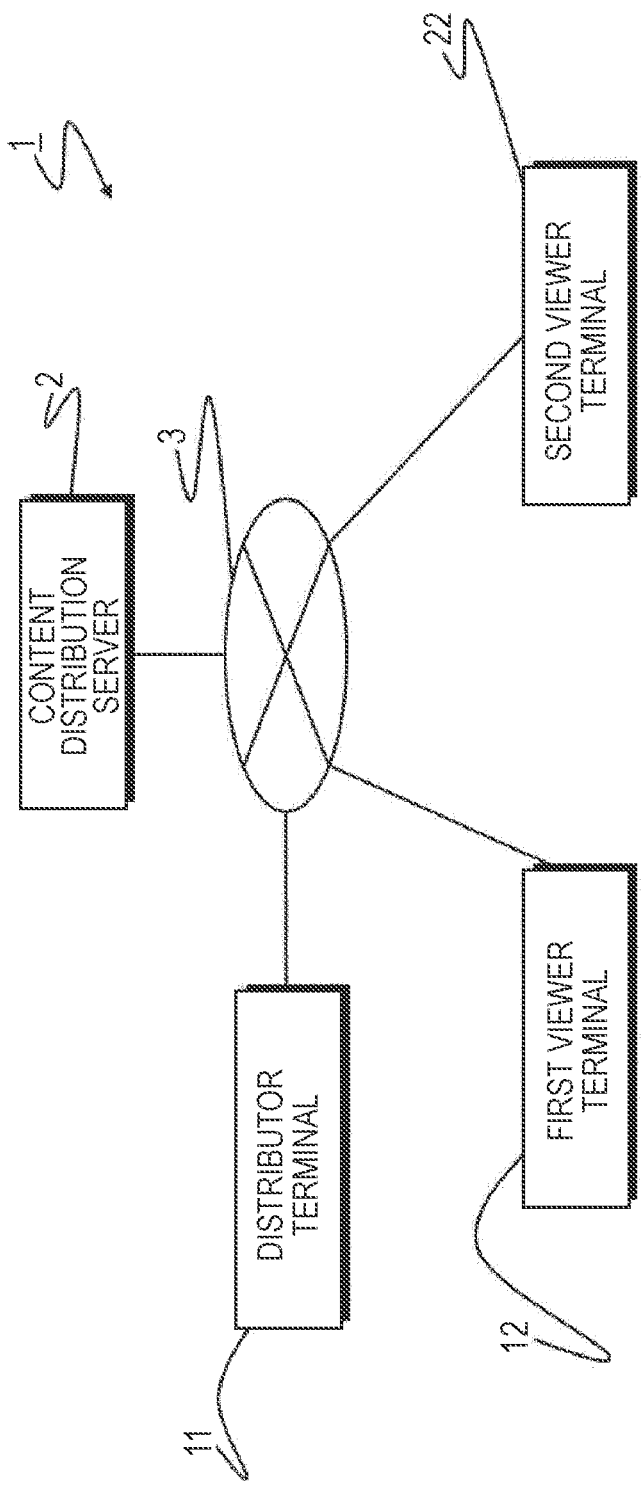
FIG. 1 is a schematic view of a configuration of a content distribution and reception system according to the invention.

FIG. 1 is a diagram schematically illustrating the configuration of a content distribution and reception system 1 according to the invention.

The content distribution and reception system 1 includes a content distribution server 2, a distributor terminal 11, a first viewer terminal 12, and a second viewer terminal 22, and such configurations are connected to each other through an internet communication network 3 or the other communication network such that data exchange can be performed. The content distribution server 2 is a server configured such that a general-purpose computer is operated by a computer program dedicated this system 1.

The distributor terminal 11, for example, is a personal computer that is used in internet live broadcast that is the distribution of a live content using a virtual space 30 described below and is used by a distributor hosting the live content. The first viewer terminal 12, for example, is a personal computer that is used by a viewer viewing the live content described above, as live broadcast, or may be attained by using various information terminals such as a smart phone or a personal digital assistant (PDA).

Similarly, the second viewer terminal 22, for example, is a personal computer that is used by a viewer viewing the live content described above in the form of a reproduction content or internet live broadcast, or may be attained by using various information terminals such as a smart phone or a personal digital assistant (PDA).

Note that, in order to simplify and clarify the configuration illustrated in FIG. 1 and the above description, the number of terminals to be configured or the like is limited, but in the implementation of the invention, it is obvious that a larger number of viewer terminals can be included.

[Configuration of Content Distribution Server 2]

Figure 2:
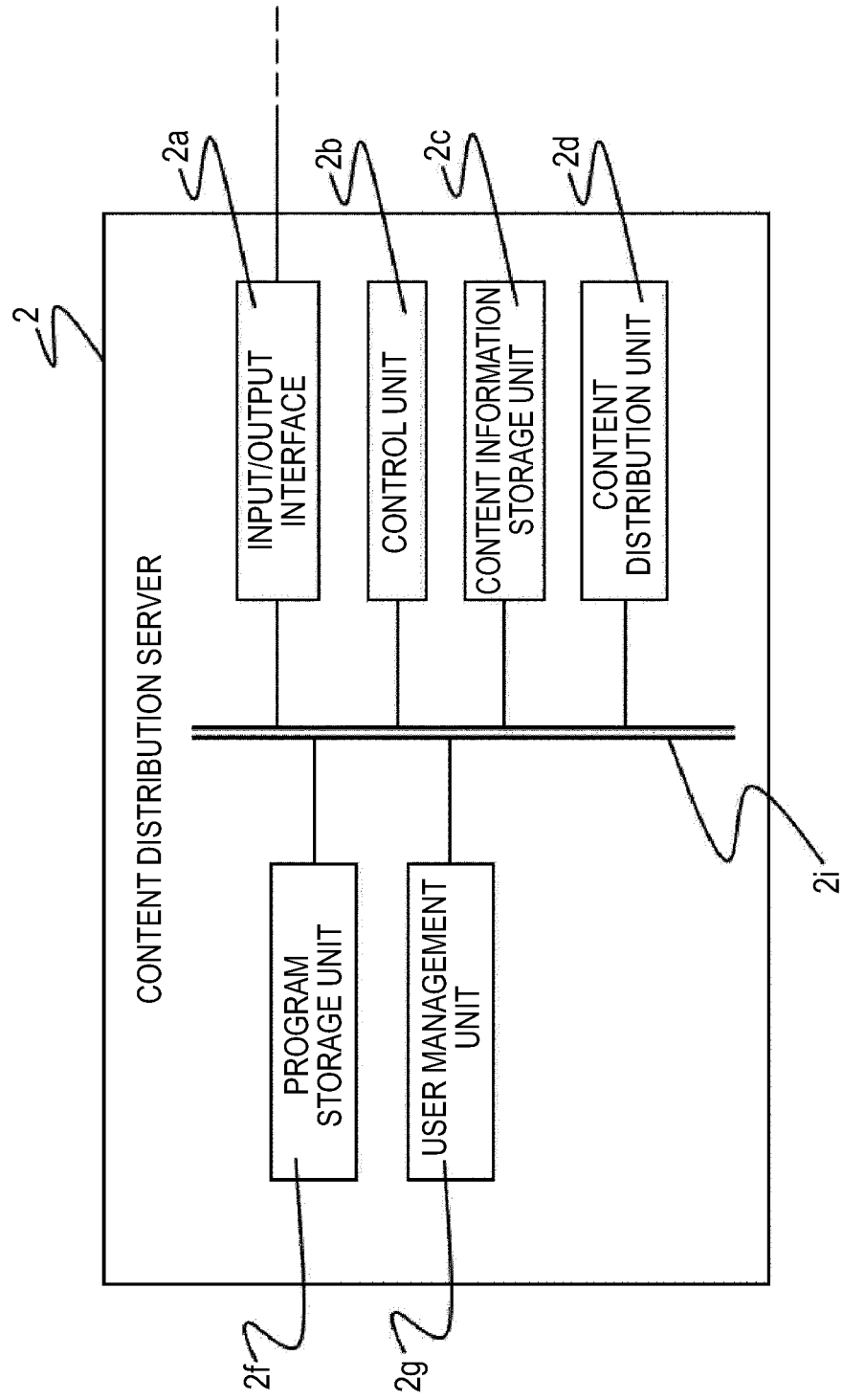
FIG. 2 is a block diagram schematically illustrating one configuration example of a content distribution server provided in the content distribution and reception system of FIG. 1.

FIG. 2 is a block diagram schematically illustrating one configuration example of the content distribution server provided in the content distribution and reception system of FIG. 1.

As illustrated in FIG. 2, the content distribution server 2 includes an input/output interface 2a that is a data transmission terminal inside and outside the server, and a control unit 2b including a central processing unit (CPU) controlling the operation of each configuration of the server 2.

Similarly, a content information storage unit 2c provided in the server 2 stores information of a content (a broadcasting program) that is being subjected to internet live broadcast or is planned to be subjected to the internet live broadcast in the future, information of a distributor distributing the content, information of whether the content accepts or refuses the participation of an avatar from the outside, information of a specific viewer in a case where the participation of an avatar only from the specific viewer is allowed, or the like.

A content distribution unit 2d transmits the live content transmitted from the distributor terminal 11 to each of the terminals that have requested viewing and provides the live content for the viewing. A program storage unit 2f stores a program for attaining each execution operation of the server 2, or the like.

A user management unit 2g retains information of the distributor terminal that is used by the distributor hosting each live content described above, the viewer terminal that is used by the viewer viewing the live content to perform the viewing, the modification, or the addition of the content, or the like, as data such as an internet protocol (IP) address or account information of a moving image distribution service, and thus, stores to which terminal a certain live content is transmitted and supplied, as data, by using the information that is stored in the user management unit 2g.

A bus line 2i connects the configurations of the server 2 to each other such that data exchange can be performed.

[Configuration of Distributor Terminal 11]

Figure 3:
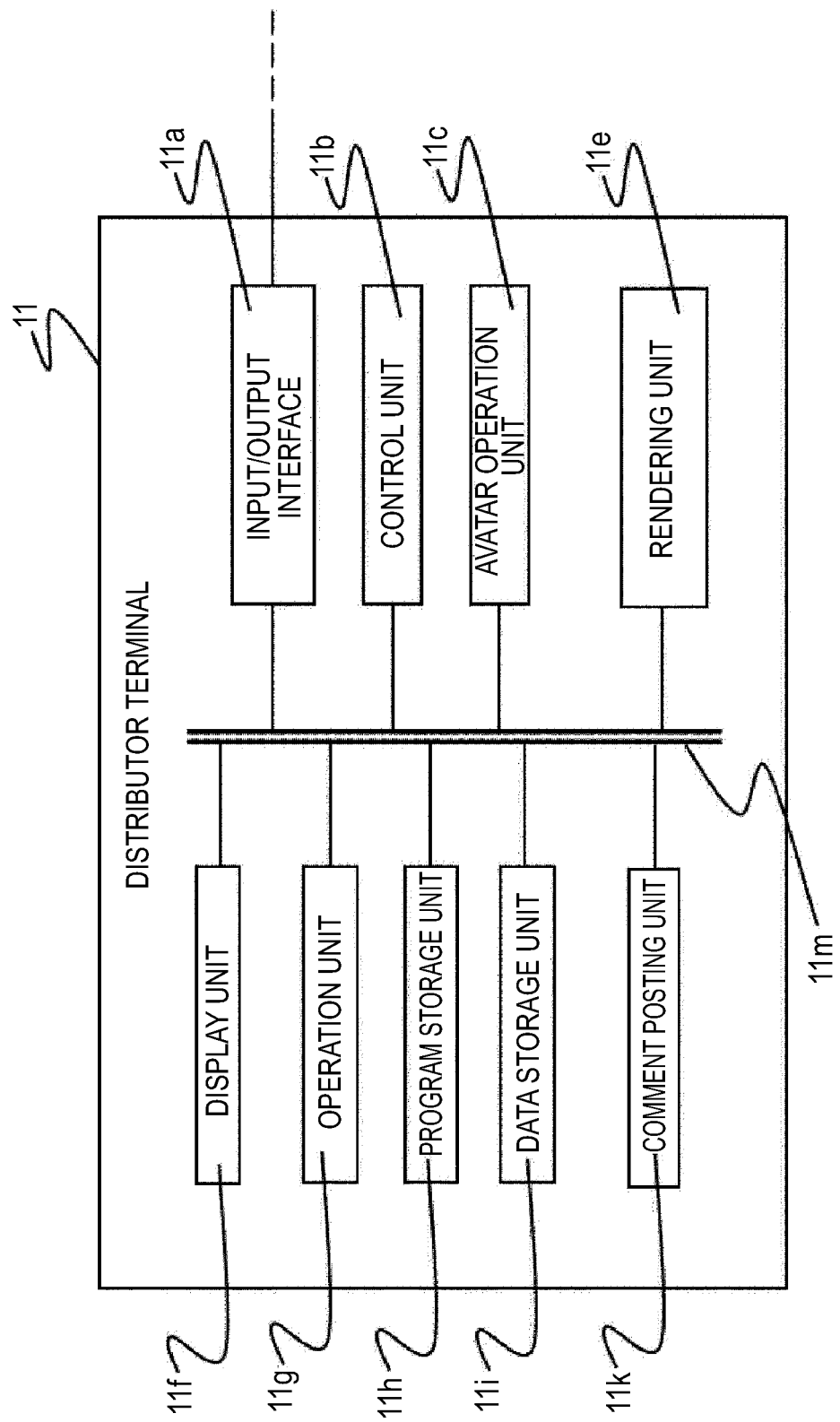
FIG. 3 is a block diagram schematically illustrating one configuration example of a distributor terminal provided in the content distribution and reception system of FIG. 1.

FIG. 3 is a block diagram of the distributor terminal provided in the content distribution and reception system of FIG. 1.

As illustrated in FIG. 3, the distributor terminal 11, first, includes an input/output interface 11a that is an information input/output terminal inside and outside the terminal, and a control unit 11b including a central processing unit (CPU) controlling each configuration of the terminal 11.

In order for the distributor to allow an avatar that is the own virtual alter ego to appear in the virtual space and to perform a desired operation, first, appearance data of the avatar, voice character data of the avatar, sound effect data of the avatar, music data of the avatar, and the like are stored in a data storage unit 11i of the distributor terminal 11, as specification data of the avatar that is one of specification data of a virtual object described above, and an avatar operation unit 11c acquires motion data by using data obtained by photographing the own movement with an acceleration sensor or a 3D camera mounted on the body of the distributor or the like who is an operator, or data obtained by sensing the movement of each part of the own body with a Doppler sensor, and acquires motion data of the avatar that is one of motion data of the virtual object described above.

Figure 9:
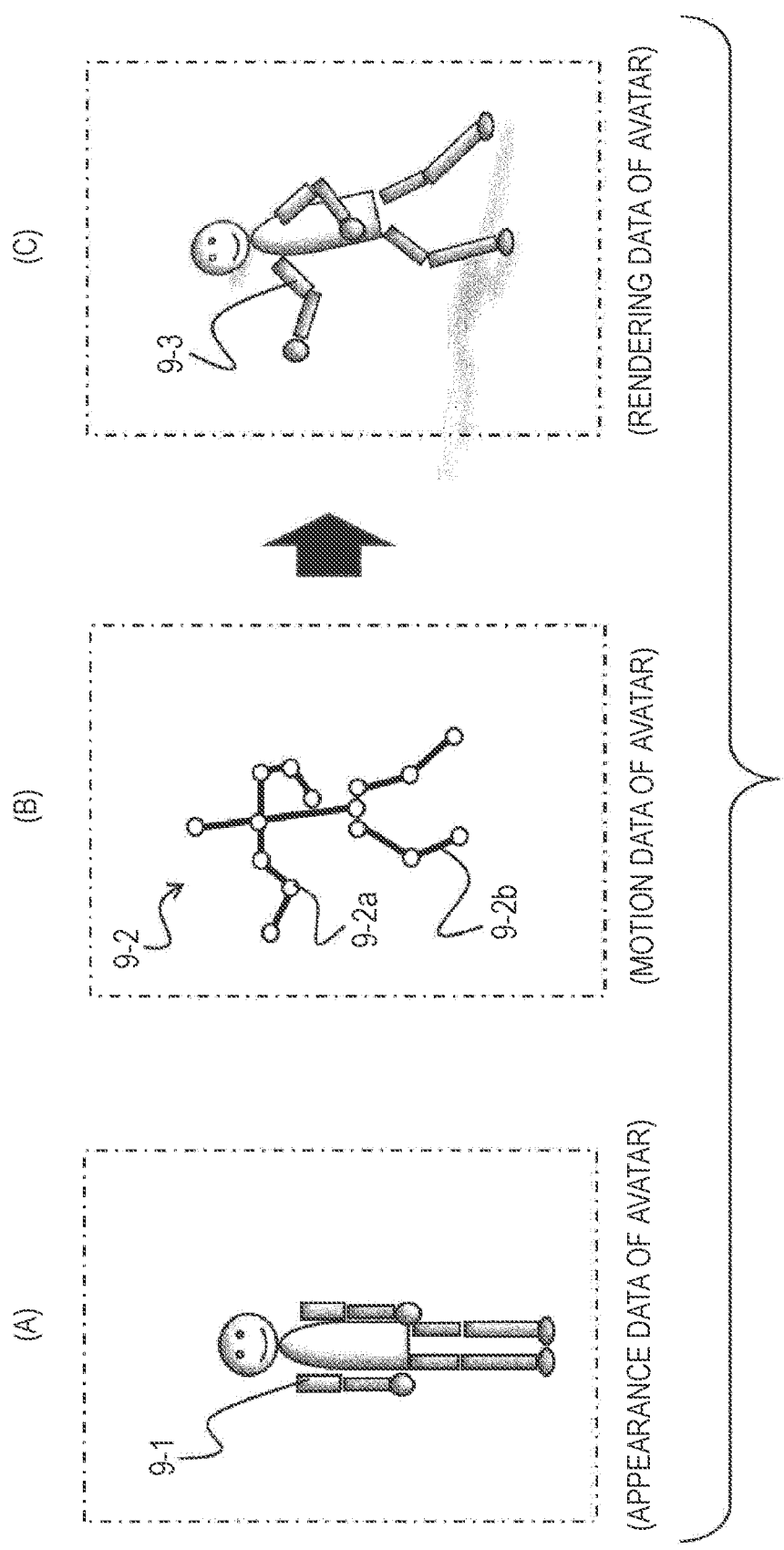
FIG. 9 is a schematic view of avatar rendering data that is used in the content distribution and reception system of the invention.

FIG. 9 is a schematic view of avatar rendering data that is used in the content distribution and reception system of the invention.

Specifically, as illustrated in FIG. 9, the avatar operation unit 11c determines whether to prepare the specification data including appearance data 9-1 of the avatar, which is one of the specification data of the virtual object, by itself, or to select data from data items that are prepared by the system and are provided for selection, by designating a uniform resource locator (URL) of the appearance data or the specification data disposed on a network.

Then, as illustrated in FIG. 9(B), position information and movement information are obtained by using each part of the body as a joint 9-2a, as motion data 9-2 that is a result of sensing the movement of each part of the own body of the distributor. Information of a ramus 9-2b connecting the joints 9-2a may be further generated to clarify a relationship between the joints 9-2a. Note that, the specification data of the avatar that is one of the specification data of the virtual object, for example, is frequency characteristic data of a voice (voice character data) for changing a voice generated by a male to the voice of a young female in a case where an avatar with the appearance of a young female is operated by a male, a special sound effect in a case where the avatar is moved, data of the background music played characteristically in a case where the avatar appears, and the like, and it is obvious that the specification data may include other data items.

Similarly, in virtual objects other than the avatar (also referred to as a virtual item, a virtual object, or the like), in a case where not only the appearance data but also an item is generated, the voice character data may be added as the specification data, and similarly, the sound effect data or the music data may be added to each of the virtual objects, as the specification data. The above respects are common to various virtual objects including the avatar that is used in this system 1.

A rendering unit 11e performs rendering (drawing) with respect to the virtual object by using the specification data of the virtual object and the motion data of the virtual object that are transmitted from the outside of the terminal 11 or stored inside the terminal 11, receives data relevant to the virtual object of the current live content that is being distributed from the terminal 11, from the server 2, and is used for monitoring to check the contents of the content in real time.

For this reason, the rendering unit 11e performs drawing (rendering) for visualizing the virtual space by using the specification data of the avatar including the appearance data 9-1 of the avatar described above, and the motion data 9-2, and as described below, the specification data and the motion data of the virtual object that is thrown into a three-dimensional virtual space, and the background image of the three-dimensional virtual space or the specification data and the motion data of the virtual object that is placed in the virtual space, and displays the obtained image of the virtual space including an embedded virtual object on a display unit 11f of the distributor terminal 11.

As described above, for example, in the rendering with respect to the avatar, as illustrated in FIG. 9(C), with respect to the avatar appearance data 9-1 that is one of the specification data of the virtual object, the position or the movement of each part is obtained from the motion data 9-2, and rendering data 9-3 of the avatar indicating the current position or movement of the avatar is generated.

Note that, the rendering can be performed by using the appearance data 9-1 of the avatar that is still image data but not moving image data, and data of the joint 9-2a or the ramus 9-2b configuring the motion data 9-2 of the avatar, and thus, the appearance data 9-1 is the still image data and has small data capacity, the data of the joint 9-2a or the ramus 9-2b is coordinate data or motion vector data of the limited number of points but not image data and has small data capacity, and as a result thereof, a load on a transmission path or hardware necessary for the transmission, the reception, the storage, or the rendering of the data can be extremely decreased.

Further, insofar as the appearance data 9-1 of the avatar or the specification data is designated by a uniform resource locator (URL) but not raw data (specific raw data), as a storage destination of data on a WEB, the transmission or the storage can be performed with smaller letter string data. Advantages thereof are to obtain the same effect regardless of which configuration of the system generates, transmits, stores, and renders the appearance data, the specification data, or the motion data, and are the common effect at the time of rendering the virtual object without being limited to a human avatar.

Note that, in a case where the avatar is displayed by including not only the appearance but also the voice (herein, "display" is used as a meaning including not only the display of an image but also the display of a voice, a sound effect, or the like using a speaker, an oscillator, or the like), information of a voice generated by the avatar, and character information of the voice may be included in a data target that is transmitted/received or stored by the system 1.

For example, as described above, in a case where an avatar has the appearance and the character of a young female, and a distributor or the like who operates the avatar is a male, the original voice production of the male is first stored, and the stored male voice is changed to the voice production of the young female and is used in the display of the avatar. It is effective that character information of the voice production that is used in the voice change (a frequency spectrum of voice production of a young female character, or the like) is included in the appearance information of the avatar or other information items, along with voice production information of a person operating the avatar, such as the distributor. Similarly, when the virtual object is added to the live content, a sound effect (explosion sound, collision sound, flying sound, onomatopoeia, and the like) or music may be added, and such sound effect data and music data may be target data that is transmitted/received or stored by the system 1. In addition, such sound effect data and music data may be added to the specification data of the avatar or other data items. Note that, the specification data may include data relevant to oscillation, and in such a case, for example, a controller operating the avatar (an operation tool with a button or the like) may oscillate, and such a respect also applies to each part and each mode of the system 1.

A display unit 11f performs screen display in order for the distributor itself to view the live content, to monitor a rendering image for checking the contents of the current live content that is being distributed by the distributor, or to perform various operations, and is attained by a display panel of a personal computer, a goggle-type head mount display (HMD) mounted on the face, and the like. An operation unit 11g is used by the distributor to operate various operations, and for example, may be a keyboard of a personal computer, a mouse, a touch panel, or the like, or may be a device that is operated by motion data of an operator. A program storage unit 11h stores a computer program necessary for the distribution or the viewing of the live content, and may include a general-purpose computer operating system (OS), an internet browsing program (a browser), and the like. A data storage unit 11i stores background data of the virtual space that is used in the live content, specification data and motion data of virtual data, and the like.

A comment posting unit 11k has a configuration for posting a comment that is letter information displayed over the display screen of the live content, displayed on the surface of the virtual object in the virtual space 30, or displayed as a virtual object that is independent itself, such as an object in the form of a large letter, to the server 2. A bus line 11m connects the configurations of the distributor terminal 11 to each other such that data exchange can be performed.

The first viewer terminal 12 and the second viewer terminal 22 have a common configuration, and hereinafter, the first viewer terminal 12 will be described as an example.

[Configuration of First Viewer Terminal 12]

Figure 4:
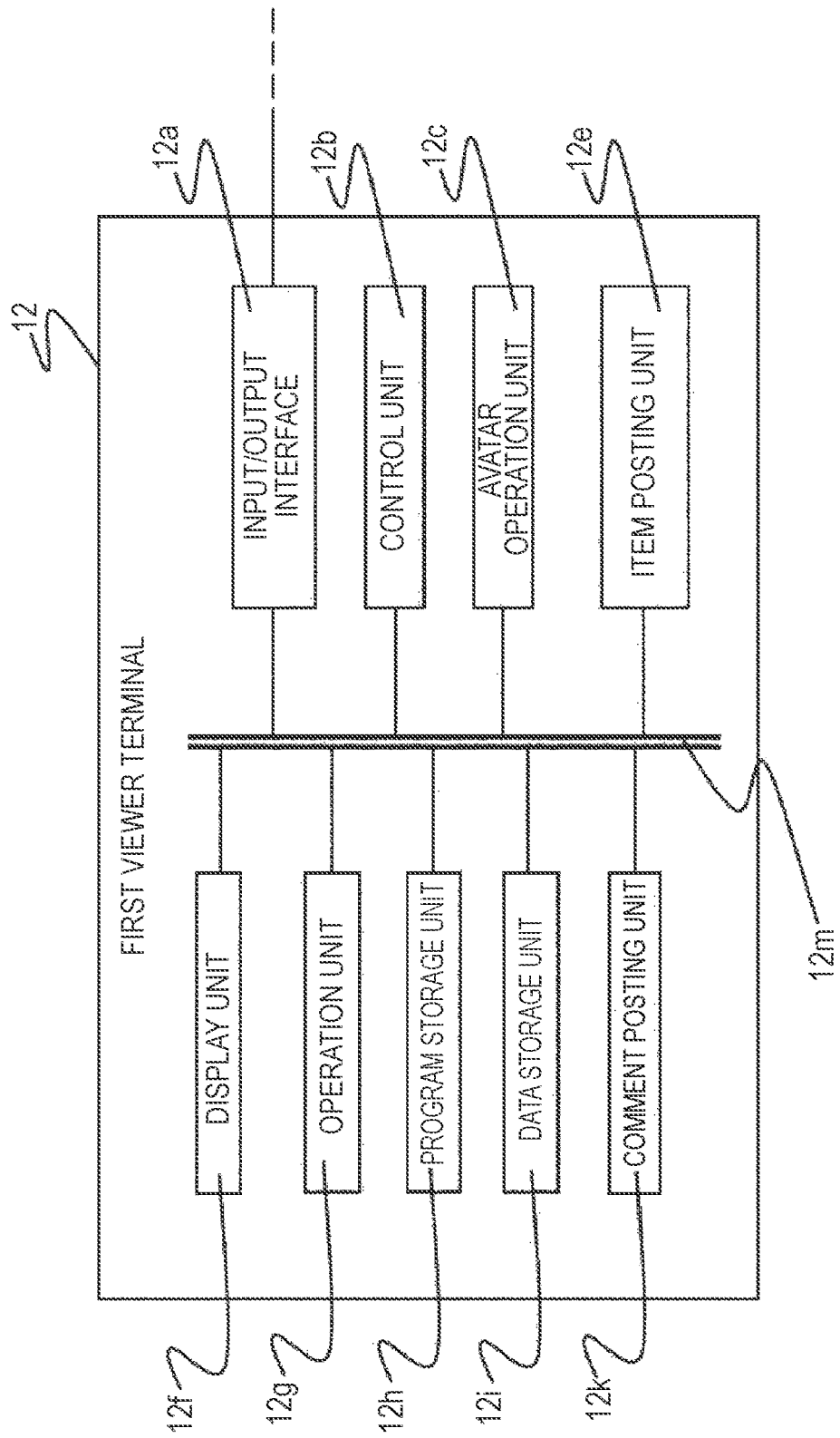
FIG. 4 is a block diagram schematically illustrating one configuration example of a first viewer terminal provided in the content distribution and reception system of FIG. 1.

FIG. 4 is a block diagram schematically illustrating one configuration example of the first viewer terminal provided in the content distribution and reception system of FIG. 1.

As illustrated in FIG. 4, the first viewer terminal 12 includes an input/output interface 12a that is a data transmission and reception terminal inside and outside the terminal 12, and a control unit 12b including a central processing unit (CPU) controlling each part of the terminal 12.

The appearance data of the avatar, the voice character data of the avatar, the sound effect data of the avatar, the music data of the avatar, and the like are stored in a data storage unit 12i, as the specification data of the avatar that is one of the specification data of the virtual object, described above, and in order for the viewer or the like who is an operator to allow an avatar that is the own virtual alter ego to appear in the virtual space and to perform a desired operation, an avatar operation unit 12c acquires motion data by using data obtained by photographing the own movement with an acceleration sensor or a 3D camera mounted on the own body or data obtained by sensing the movement of each part of the own body with a Doppler sensor, and transmits the motion data to the server 2 directly or as rendered image information.

As described above, with reference to FIG. 9, the avatar operation unit 12c determines whether to prepare the specification data of the avatar including the appearance data 9-1 of the avatar, which is one of the specification data of the virtual data, by itself, or to select data from data items that are prepared by the system and are provided for selection, by designating a uniform resource locator (URL) of the appearance data or the specification data disposed on a network. Then, as illustrated in FIG. 9(B), the position information and the movement information are obtained by using each part of the body as the joint 9-2a, as the motion data 9-2 that is the result of sensing the movement of each part of the body. The information of the ramus 9-2b connecting the joints 9-2a may be further generated to clarify the relationship between the joints 9-2a.

Note that, in a case where the avatar is displayed by including not only the appearance but also the voice (herein, "display" is used as a meaning including not only the display of an image but also the display of a voice, a sound effect, or the like using a speaker, an oscillator, or the like), information of a voice generated by the avatar, and character information of the voice may be included in a data target that is transmitted/received or stored by the system 1, as the specification data of the avatar including the appearance data of the avatar.

For example, in a case where an avatar has the appearance and the character of a young female, and a distributor or the like who operates the avatar is a male, the original voice production of the male is first stored, and the stored male voice is changed to the voice production of the young female and is used in the display of the avatar. It is effective that character information of the voice production that is used in the voice change (a frequency spectrum of voice production of a young female character, or the like) is included in the specification information of the avatar including the appearance information of the avatar, along with voice production information of a person operating the avatar, such as the viewer. Similarly, when the virtual object is added to the live content, a sound effect (explosion sound, collision sound, flying sound, onomatopoeia, and the like) or music may be added, and such sound effect data and music data may be target data that is transmitted/received or stored by the system 1. In addition, such sound effect data and music data may be added to the specification data of the avatar, along with the appearance information or other data items.

In order for the viewer to allow the own avatar to appear in the live content that is being viewed by the viewer himself/herself, an item posting unit 12e is used for posting the specification data of the virtual object including the appearance data of the avatar, or the motion data of the virtual object described above, to the server 2, or for posting a new virtual object to the live content that is being viewed by the viewer himself/herself.

A display unit 12f performs screen display in order for the viewer himself/herself to view the live content or to perform various operations, and is attained by a display panel of a personal computer, a goggle-type head mount display (HMD) mounted on the face, and the like.

An operation unit 12g is used by the viewer to operate various operations, and may be a keyboard of a personal computer, a mouse, or a touch panel, or may be a device that is operated by motion data of an operator.

A program storage unit 12h stores a computer program necessary for the viewing of the live content, and may include a general-purpose computer operating system (OS), an internet browsing program (a browser), and the like. A data storage unit 12i stores the data described above and various other data items.

A comment posting unit 12k has a configuration for posting a comment that is letter information displayed over the display screen of the live content, displayed on the surface of the virtual object in the virtual space 30, or displayed as a virtual object that is independent itself, such as an object in the form of a large letter, to the server 2. A bus line 12m connects the configurations of the viewer terminal 12 to each other such that data exchange can be performed.

Figure 5:
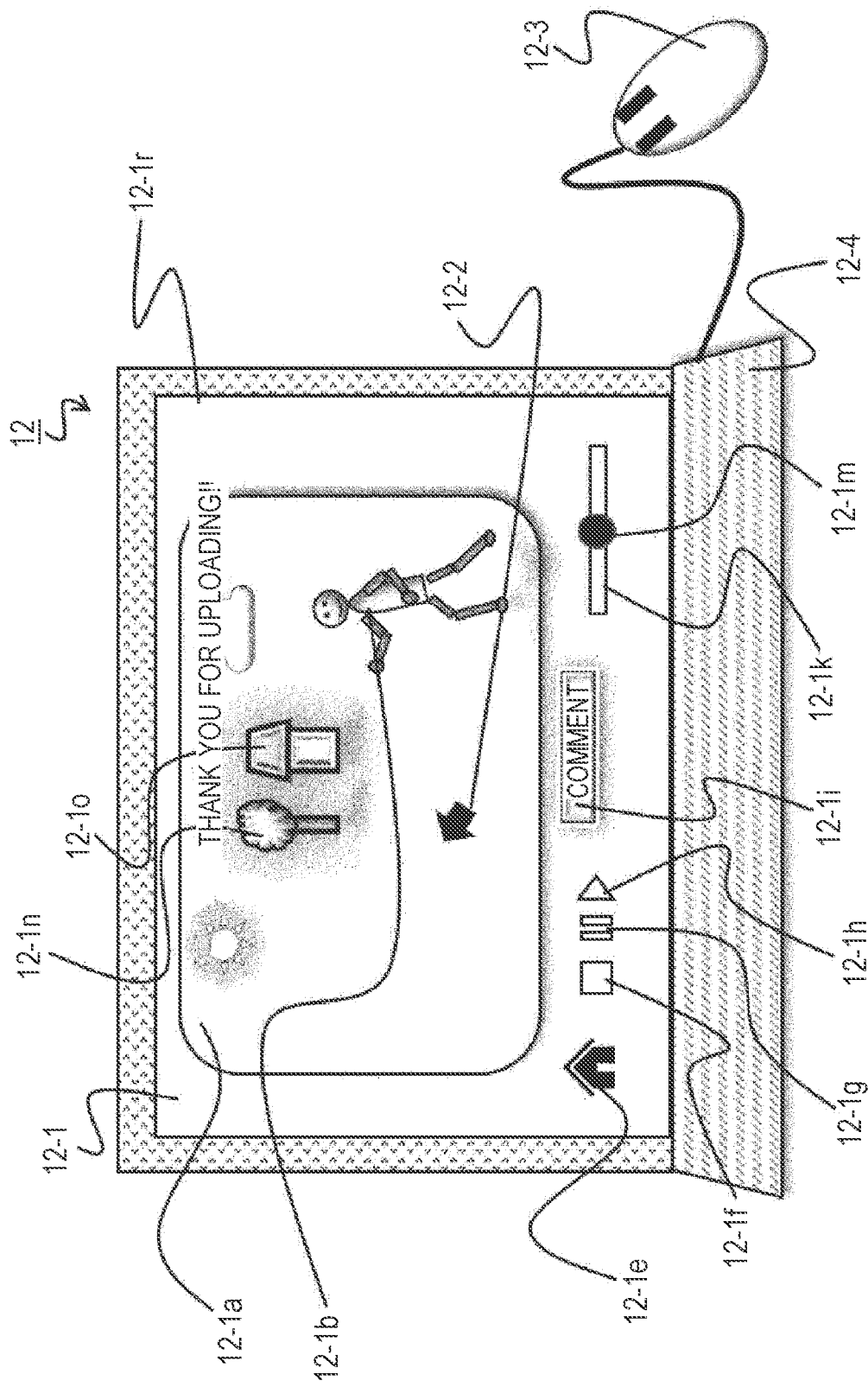
FIG. 5 is a schematic view of an appearance of the first viewer terminal of FIG. 4.

FIG. 5 is a schematic view of the appearance of the first viewer terminal of FIG. 4.

FIG. 5 schematically illustrates an appearance in a case where the first viewer terminal 12 is attained by a personal computer, as an example, and in a case where the viewer performs connection with respect to the server 2 by inputting a uniform resource locator (URL) known in advance, in order to use the service of the this system 1, necessary data and a JavaScript (Registered Trademark) program are sent from the server 2, and a portal screen of a moving image distribution service (not illustrated) is displayed on a display panel 12-1 displaying various images, still images, moving images, or letter information.

The viewer selects in advance a live content that the viewer himself/herself wants to view as the internet live broadcast, from a display list (not illustrated), and FIG. 5 illustrates a situation in which the live content that is selected in advance by the viewer is displayed.

In FIG. 5, the display panel 12-1 includes a moving image display area 12-1a for displaying a live content moving image, and in the moving image display area 12-1a, an avatar 12-1b of a distributor who is the distributor of the live content, and a tree 12-1n and a house 12-1o that are a virtual object disposed in a virtual space in which the live content is used are displayed.

In addition, a comment 12-1r that is posted from the viewer viewing the content is further displayed in the display panel 12-1, and the comment 12-1r of the contents such as "Thank you for uploading!!" appears from the right end of the display panel 12-1, is moved to the left end by scroll movement, and disappears. A range in which the comment 12-1r is displayed is larger than the moving image display area 12-1a for displaying the live content moving image and is set to extend over the moving image display area 12-1*a*, and thus, the viewer is capable of clearly understanding that the comment 12-*r* is not the original contents of the content, but is posted from a poster different from the distributor of the content.

Similarly, a home button display 12-1*e* for returning to a portal (entrance) page (not illustrated) of the moving image distribution service, and a stop button display 12-1*f*, a pause button display 12-1*g*, and a reproduction button display 12-1*h* that are used in a case where the content that is being viewed is not the live broadcast but the reproduction content are respectively displayed on the display panel 12-1.

A comment posting button display 12-1*i* in the display panel 12-1 is a button for posting the comment described above with respect to the content that is being viewed by the viewer in a case where the terminal 12 is a viewer terminal.

In a case where the content is the reproduction content, in a seek bar display 12-1*k*, the position of a seek button display 12-*m* indicates the current reproduction time by allowing a reproduction start time to correspond to the left end and a reproduction end time to correspond to the right end, and the time can be moved to a time when the viewer wants to perform the reproduction by moving the position of the seek button display 12-1*m* with a mouse pointer 12-3. As the operation unit 12*g* described above, there are the mouse pointer 12-3 and a mouse cursor 12-2, and a keyboard 12-4 is also provided in the viewer terminal 12.

[Viewing of Content During Live Broadcast]

Next, an operation until the live content that is the internet live broadcast that is posted and distributed from the distributor terminal 11 is viewed by the first viewer terminal 12 will be described by using each of a sequence chart of FIG. 6, a schematic view of the virtual space of FIG. 7, and a diagram of a rendering result seen from each viewpoint of FIG. 8.

Figure 6:
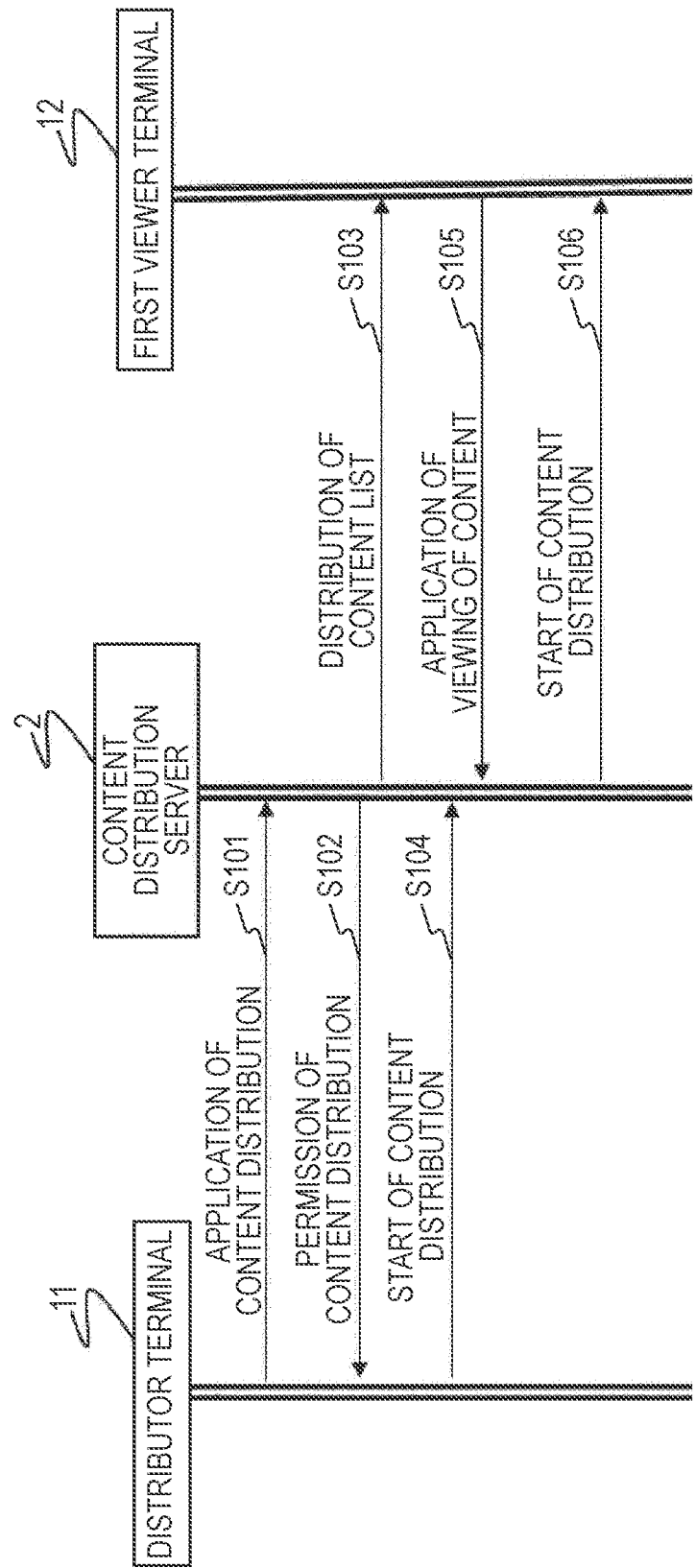
FIG. 6 is a sequence chart of an example of viewing a live broadcast content, which is executed by the content distribution and reception system of the invention.

FIG. 6 is a sequence chart of an example of viewing the live broadcast content, which is executed by the content distribution and reception system of the invention.

Figure 7:
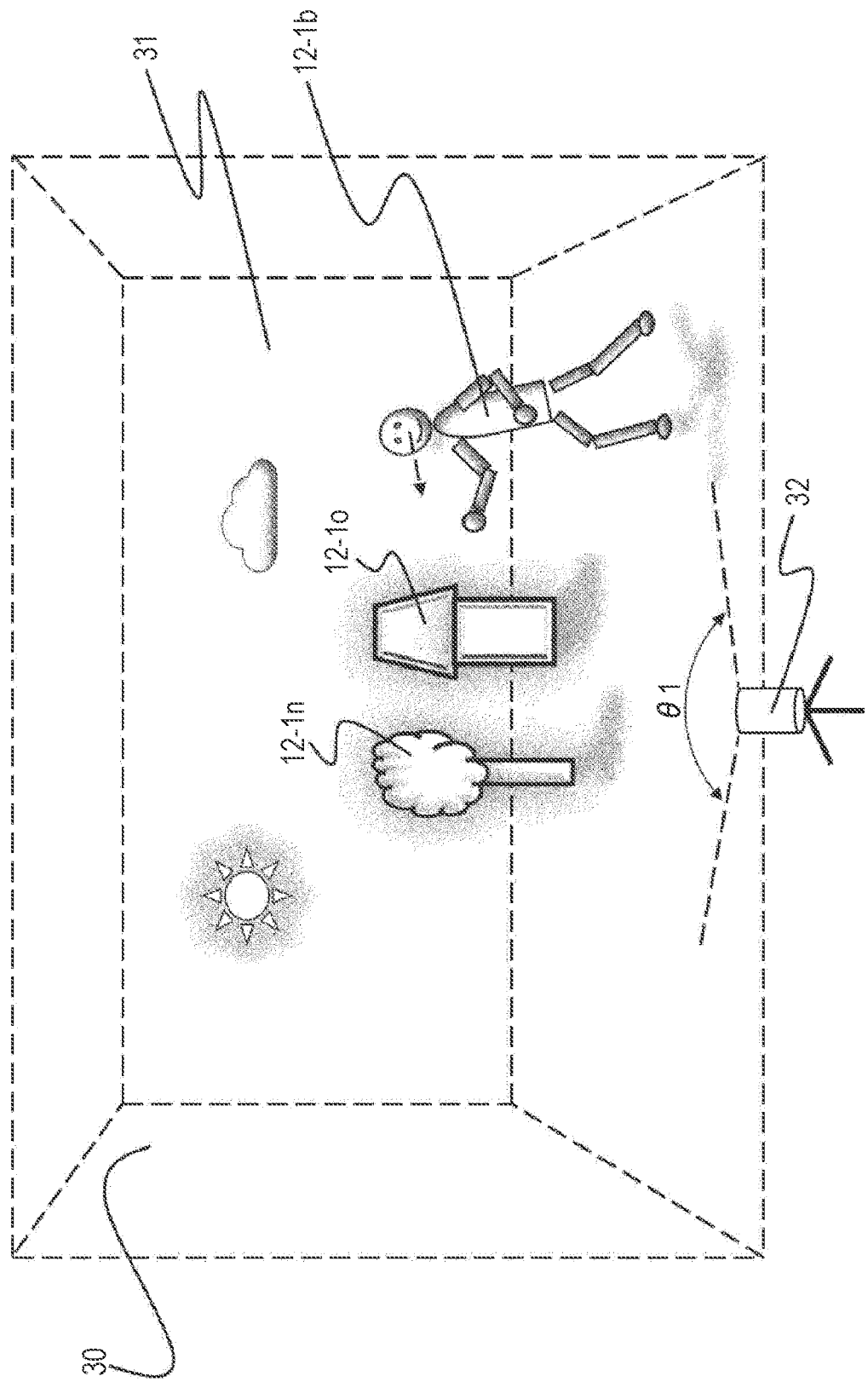
FIG. 7 is a schematic view of a virtual space that is distributed by the content distribution and reception system of the invention.

FIG. 7 is a schematic view of the virtual space that is distributed by the content distribution and reception system of the invention.

Figure 8:
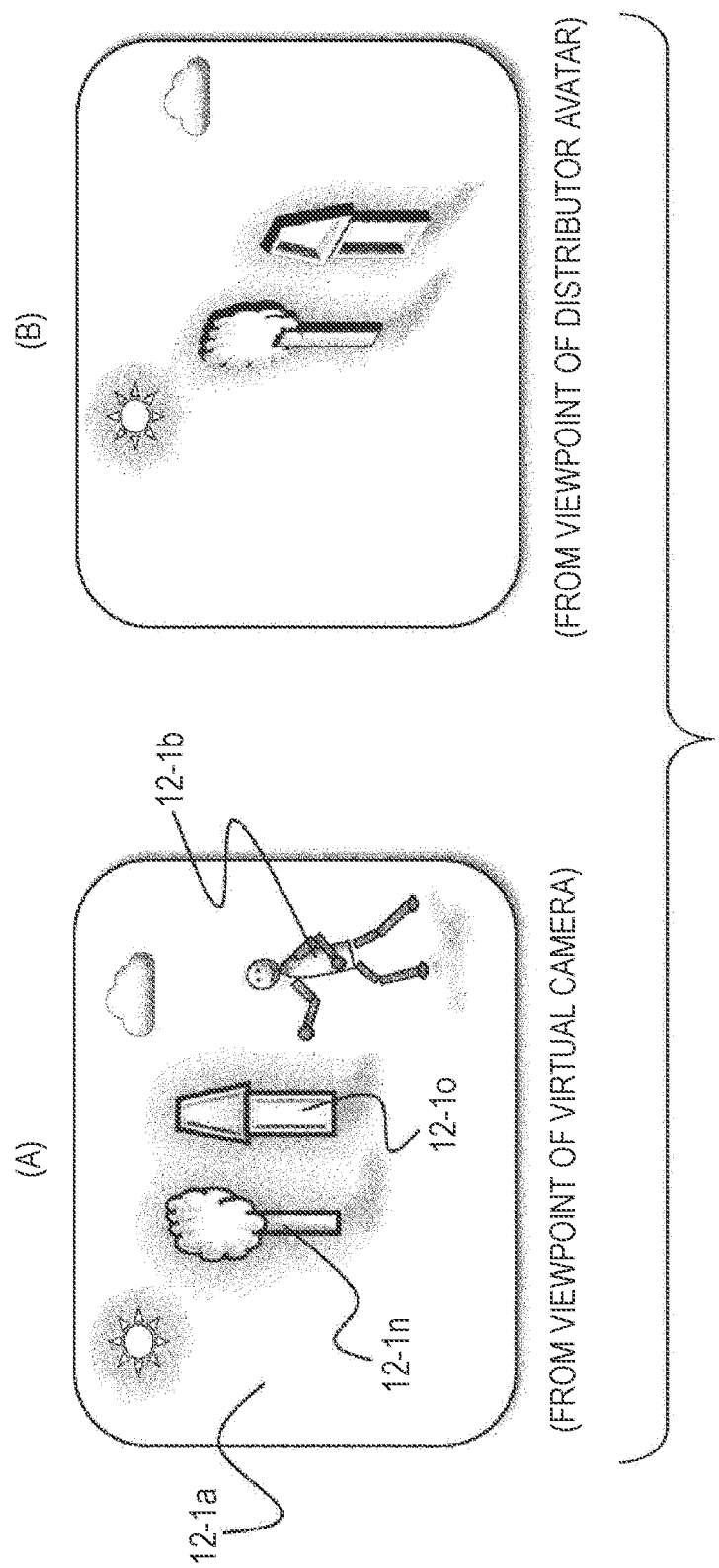
FIG. 8 is a schematic view of a distribution image of the virtual space, which is distributed by the content distribution and reception system of the invention.

FIG. 8 is a schematic view of a distribution image of the virtual space, which is distributed by the content distribution and reception system of the invention.

A distributor who plans to host and distribute a live content performs the application of content distribution with respect to the server 2 by using the first distributor terminal 11 (step S101). In a case where the server 2 permits the distribution, the permission is notified to the first distributor terminal 11 from the server 2 (step S102), and the server 2 displays the live content as a content that can be viewed on a suitable page of a distribution service site as a list or distributes the list to each of logged-in viewer terminals (step S103).

The distribution is permitted, and thus, the first distributor terminal 11 transmits specification data and motion data relevant to the display of the avatar 12-1*b* of the distributor and other virtual objects that are each virtual object in the virtual space 30 illustrated in FIG. 7, to the server 2, as a live content for internet live broadcast (S104).

As described above, the distributor generates the motion data and controls the operation of the avatar 12-1*b*, and thus, the avatar 12-1*b* is capable of performing an operation such as moving, changing the direction, moving hands or feet, or changing the posture, in the virtual space 30.

Similarly, as described above, in a case where not only the appearance but also the voice of the virtual object including the avatar is displayed (herein, "display" is used as a meaning including not only the display of an image but also the display of a voice, a sound effect, or the like using a speaker, an oscillator, or the like), information of a voice generated by the virtual object including the avatar and character information of the voice may be included in a data target that is transmitted/received or stored by the system 1, as the specification information of the virtual object.

A virtual camera 32 disposed in the virtual space 30 is not necessarily placed in the center as illustrated, but the installation location thereof may be arbitrary, and the virtual camera 32 may be moved or a plurality of virtual cameras may be installed. In addition, the virtual camera may be added, deleted, or moved in the middle of the live content. The operation of the virtual cameras is common to other parts herein, and in order to avoid complication in the following description, only one virtual camera is exemplified in each virtual space.

According to the list, a viewer who knows the existence of the live content during the broadcast performs the application of the viewing of the live content that is the internet live broadcast with respect to the server 2 from the first viewer terminal 12 (step S105), and as a result thereof, the specification data and the motion data of the virtual object in the virtual space 30, including the motion data 9-2 of the avatar 12-1*b* of the distributor of the appearance data 9-1 of the avatar, are transmitted to the first viewer terminal 12 from the server 2 (step S106), and the rendering (the drawing) is performed by the first viewer terminal 12.

A rendering result is exemplified as FIG. 8(A) (an image seen from the viewpoint of the virtual camera 32) and FIG. 8(B) (an image seen from the viewpoint of the distributor avatar 12-1*b*).

In addition, the live content that is distributed by the distributor terminal 11 is not limited to the first viewer terminal 12, but other users using this moving image distribution system including the second viewer terminal 22 are also capable of performing an application to view the live content.

[Addition of Viewer Avatar to Live Content During Live Broadcast]

Next, an operation in which a viewer using the first viewer terminal 12 allows an avatar 100 that is the own alter ego to participate in the live content in a state in which the first viewer terminal 12 is viewing the live content during the internet live broadcast that is distributed first the distributor terminal 11 will be described by using FIG. 10 to FIG. 12.

Figure 10:
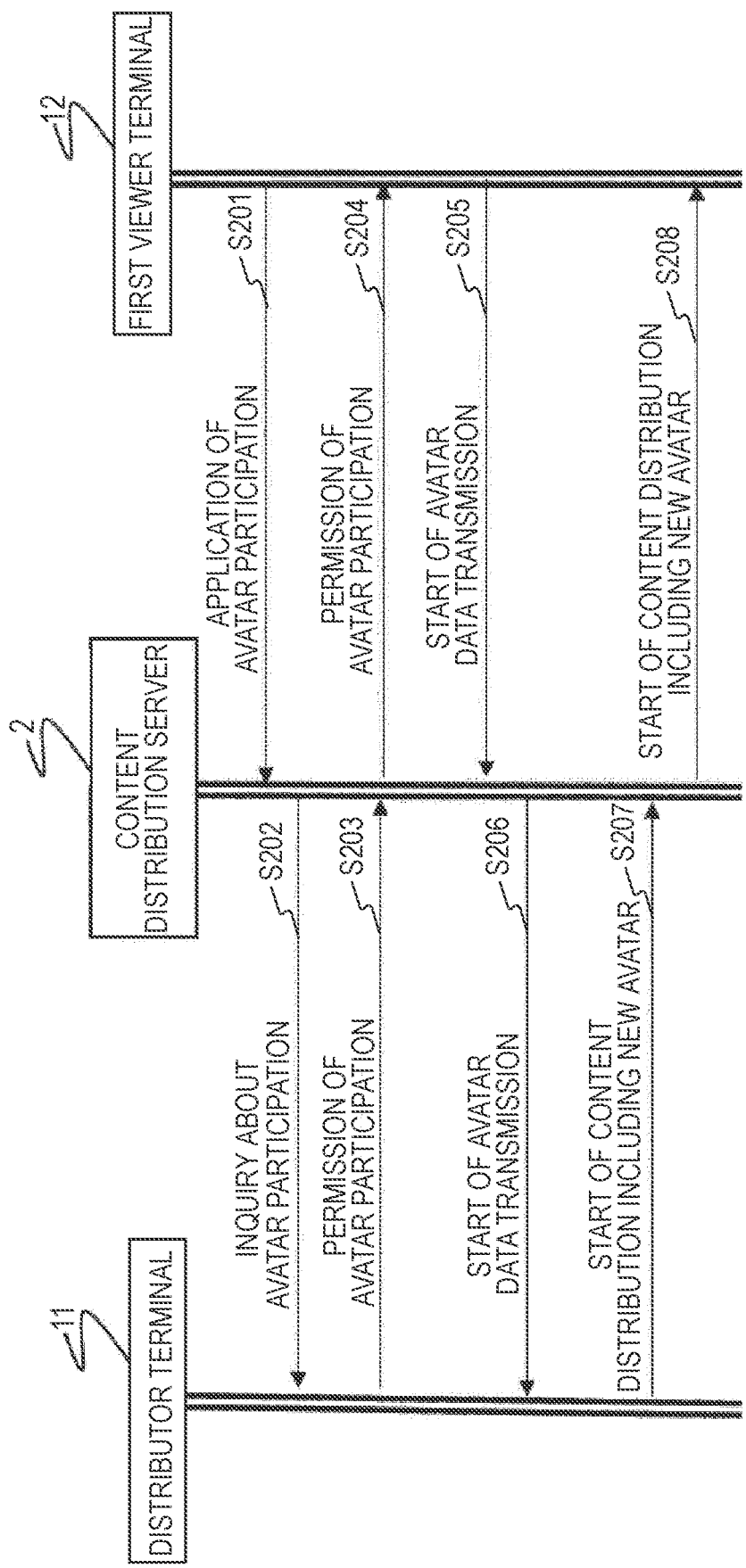
FIG. 10 is a sequence chart for describing an example of an operation when a viewer avatar participates in a content of live broadcast, in the content distribution and reception system of the invention.

FIG. 10 is a sequence chart for describing an example of an operation when a viewer avatar participates in the content during the live broadcast, in the content distribution and reception system of the invention.

Figure 11:
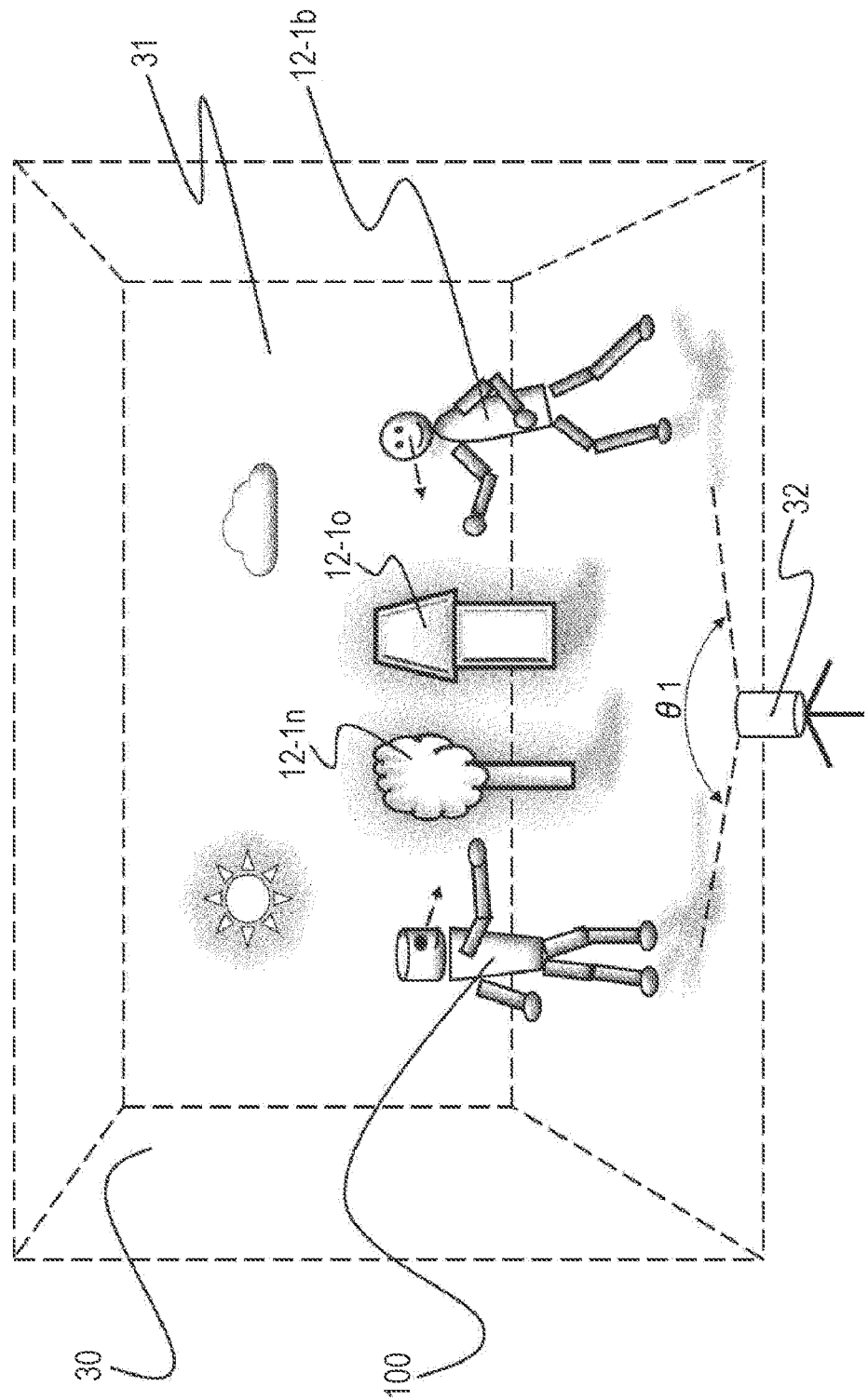
FIG. 11 is a schematic view of a virtual zone to which the viewer avatar is added, which is distributed by the content distribution and reception system of the invention.

FIG. 11 is a schematic view of a virtual zone to which the viewer avatar is added, which is distributed by the content distribution and reception system of the invention.

Figure 12:
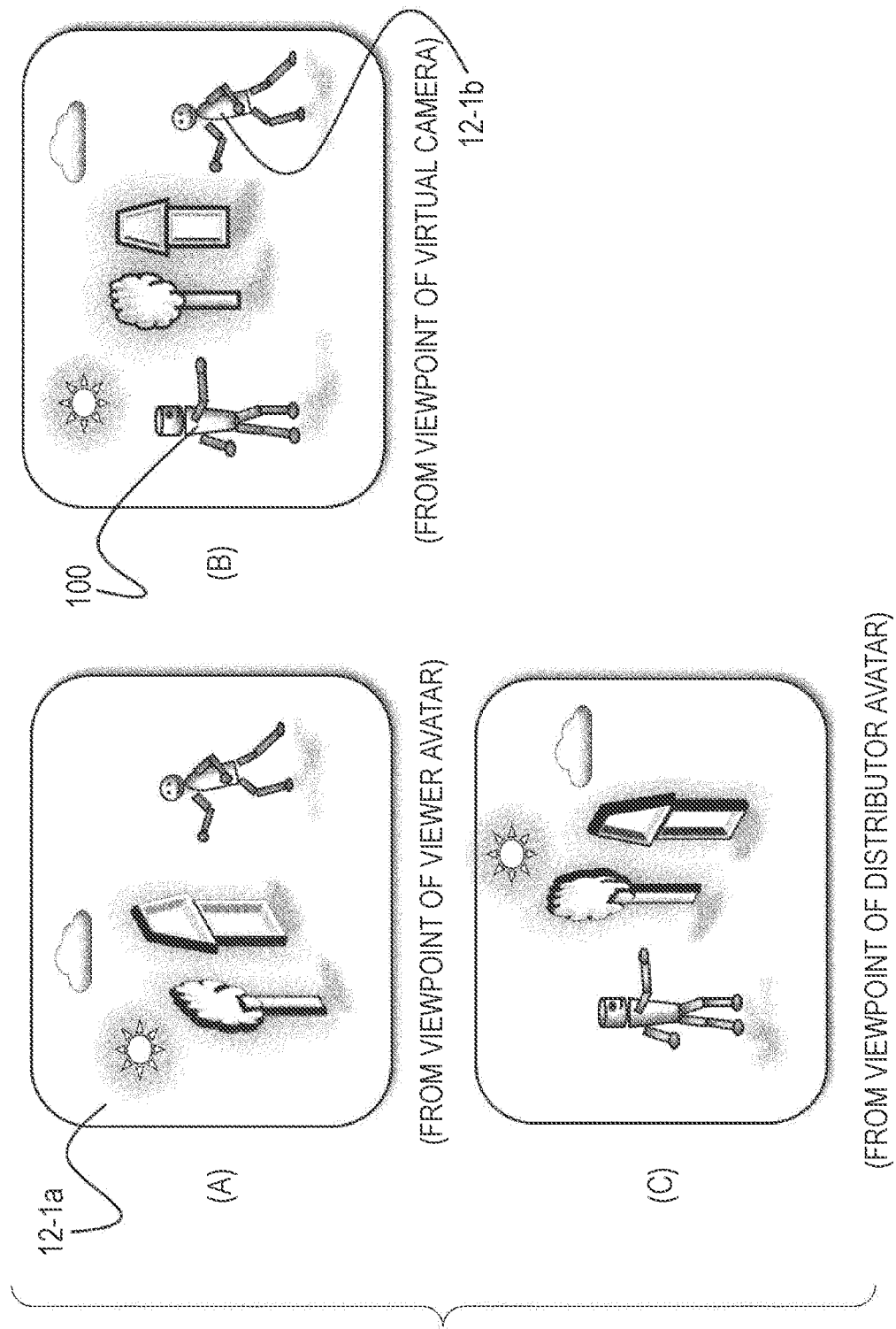
FIG. 12 is a schematic view of a distribution image when the virtual space of FIG. 11 is seen from each viewpoint, which is distributed by the content distribution and reception system of the invention.

FIG. 12 is a schematic view of a distribution image when the virtual space of FIG. 11 is seen from each viewpoint, which is distributed by the content distribution and reception system of the invention.

First, the application of avatar participation is performed with respect to the server 2 from the first viewer terminal 12 (step S201).

The server 2 accepting the application determines the necessity of the participation of the viewer avatar 100 by any of the following methods or the other method.

A first method is a method for transmitting information or the like of the viewer (for example, an online name) to the distributor terminal 11 and for requesting the determination of the distributor (step S202). In a case where the distributor permits the participation, information of the permission is transmitted to the server 2 and is further transmitted to the viewer terminal 12 by the operation of the distributor terminal 11 (steps S203 and S204).

A second method is a method for the distributor to accept in advance the participation of anyone in the live content or to set a time from when to when within a broadcast time as a time when avatar participation of anyone can be performed. Such intention of the distributor is registered by being transmitted in advance to the content distribution server 2 from the distributor terminal 11, and thus, the availability of the application of the avatar participation from the viewer terminal 11 is determined by the server 2, and a determination result is transmitted to the viewer terminal 11.

A third method is a method for the distributor to accept in advance the avatar participation only from a specific viewer. In such a case, information of the viewer that the distributor permits is registered by being transmitted in advance to the server 2 from the distributor terminal 11, as information such as an online name, a login account, and an IP address, and thus, the availability of the application of the avatar participation from the viewer terminal 11 is determined by the server 2, and a determination result is transmitted to the viewer terminal 11.

As described above, the viewer is capable of just viewing the transmitted live content of the live broadcast, but for example, in the case of a dance scene, the viewer may feel like having a sense of solidarity by participating in the live content in the form of an avatar and by dancing along with an operator of each avatar already participating in the live content, or may want to insert the own avatar into the live content and to view the live content from a desired viewpoint that is set by the viewer himself/herself.

Therefore, in a case where the viewer performs the application with respect to the server 2 in order to newly insert the own avatar 100 into the live content while viewing the live content of the live broadcast, and the application is permitted by any of the methods described above, the appearance information, the motion data, or the like of the avatar that is necessary data is transmitted to the server 2 (step S205).

The server 2 that receives the data starts to transmit the appearance data, the motion data, or the like of the viewer avatar 100 that is received from the viewer terminal 21 to the distributor terminal 11 distributing the live content (step S206), and then, in the procedure described above, the distributor terminal 11 generates data of the live content during the live broadcast (the appearance data, the motion data, or the like of each of the virtual objects including the avatar) in the contents including the viewer avatar 100 in the virtual space, and transmits the data to the server 2, as the subsequent live content (step S207), and the server 2 distributes the live content in which the viewer avatar 100 participates to each of the terminals viewing the live content, including the viewer terminal 11 (step S208). FIG. 11 is a schematic view of the virtual space in which the viewer avatar 100 participates, and FIG. 12 illustrates a distribution image when the virtual space 30 is seen from each viewpoint such as the viewer avatar 100, the virtual camera 32, and the distributor avatar 12-1b.

[Response to Action for Avatars to be in Contact with Each Other]

As described above, it is considered that the viewer who appears and participates in the live content, in the form of an avatar, wants not only the enjoyment described above such as the enjoyment in which the appearance or the movement of the own avatar is viewed by the other viewer, the enjoyment in which the virtual space of the live content is seen from the viewpoint of the avatar, or the enjoyment of having a conversation with the other avatar, but also the enjoyment of an action involving contact between the avatars such as the enjoyment of handshaking with the avatar and the enjoyment of dancing with the other avatar. Note that, in this embodiment, it is exemplified that in a case where the viewer viewing the distribution content inserts the own avatar 100 into the virtual space that is distributed by the distributor, a contact action between the avatars is attained, but such a contact action is not limited to contact between the distributor avatars and the viewer avatars, and the invention can be implemented in a contact action between all types of avatars. The same applies to the followings, and will not be noted.

An such an action involving the contact between the avatars, there is no end to the list including high-touch (a Japanese-English word of an operation of putting the palm of the hand up and hitting the palm of the hand of the other person with the own palm, in English expression, an operation of hitting one hand with one hand is referred to as "high five", and an operation of hitting two hands with two hands is referred to as "high ten"), holding hands, fighting sports such as sumo wrestling, wrestling, boxing, and arm wrestling, piggyback ride, three-legged race, hug, tapping a shoulder, pinky swear, sardines-in-the-box, chain tag, and the like, in addition to the handshake, dance, or the like, described above.

Figure 13:
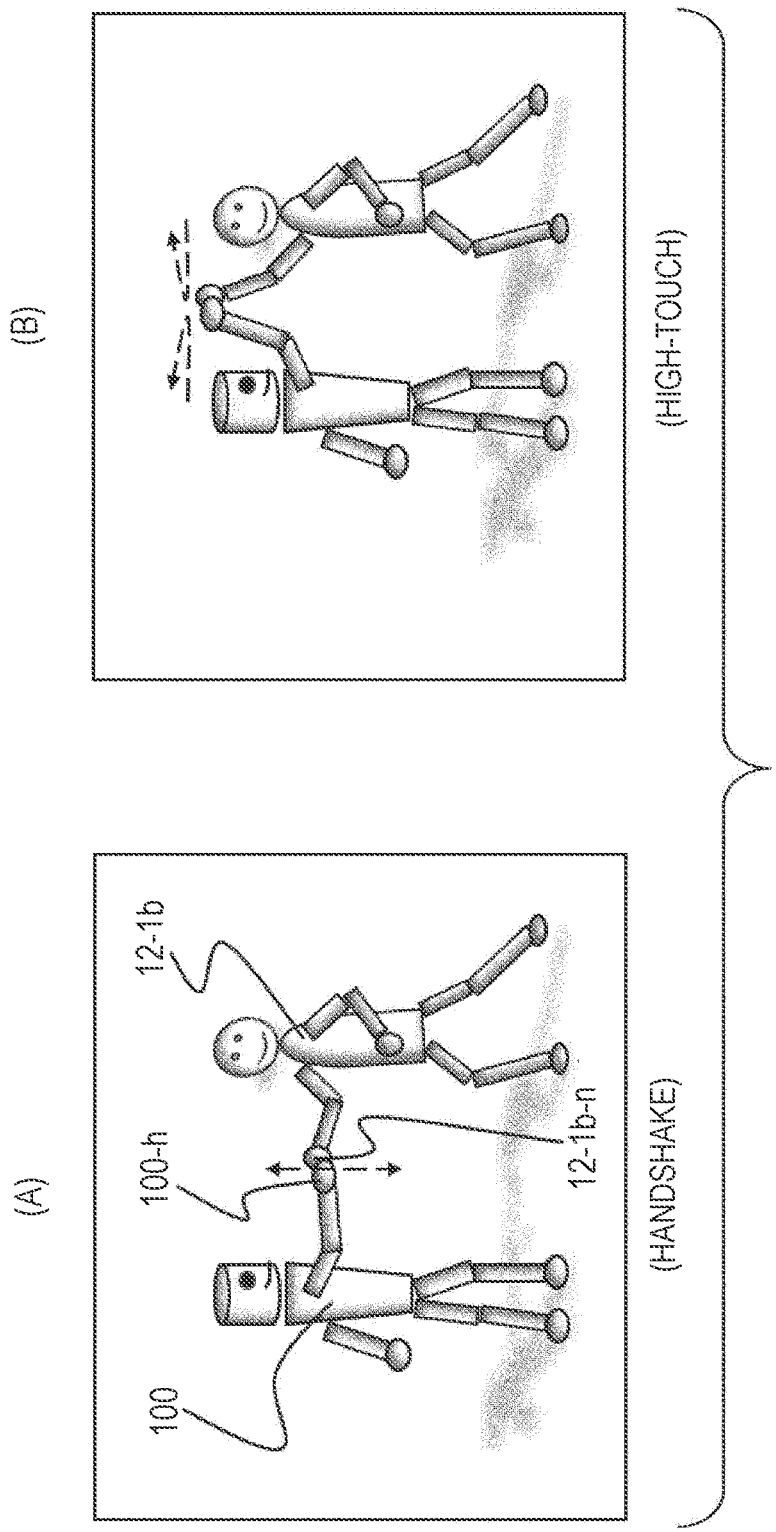
FIG. 13 is a schematic view of an example of an action for avatars to be in contact with each other, which is used in the content distribution and reception system of the invention.

FIG. 13 is a schematic view of an example of the action for the avatars to be in contact with each other, which is used in the content distribution and reception system of the invention.

FIG. 13(A) illustrates a schematic view of a scene in which the distributor avatar 12-1b and the viewer avatar 100 shake hands with each other, and similarly, FIG. 13(B) illustrates a schematic view of a scene in which both of the avatars perform one-handed high-touch, and in any scene, both of the avatars bring hands 100-h and 12-1b-h into contact with each other, and perform an operation such as joining the hands or hitting and then separating the hands.

In particular, holding hands, handshake, or high-touch is convention that is frequently performed in everyday real space, and such an operation is simply performed by joining or hitting hands, and thus, it is expected that the needs thereof increase as an operation that is performed by the avatar in the virtual space. For example, at the time of performing handshake, it is necessary for both of the avatars to stretch forth their own hands and to position the palms of the hands of the avatars to each other, precisely to some extent.

However, in the related art, in the drawing of various objects and avatars in the virtual space, in particular, in a case where there is a movement, a data transmission rate for drawing is suppressed in order to reduce a load on the system, and the movement of the avatar is decimated from the movement of the human body that a person feels in the real space, and is intermittently drawn. For this reason, in the related art, it is difficult to provide a system including the drawing of the avatar in which an action for the avatars to be in contact with each other, such as handshake between the avatars, has no unnaturalness and an excellent operational feeling from the standpoint of operating the avatar.

Figure 14:
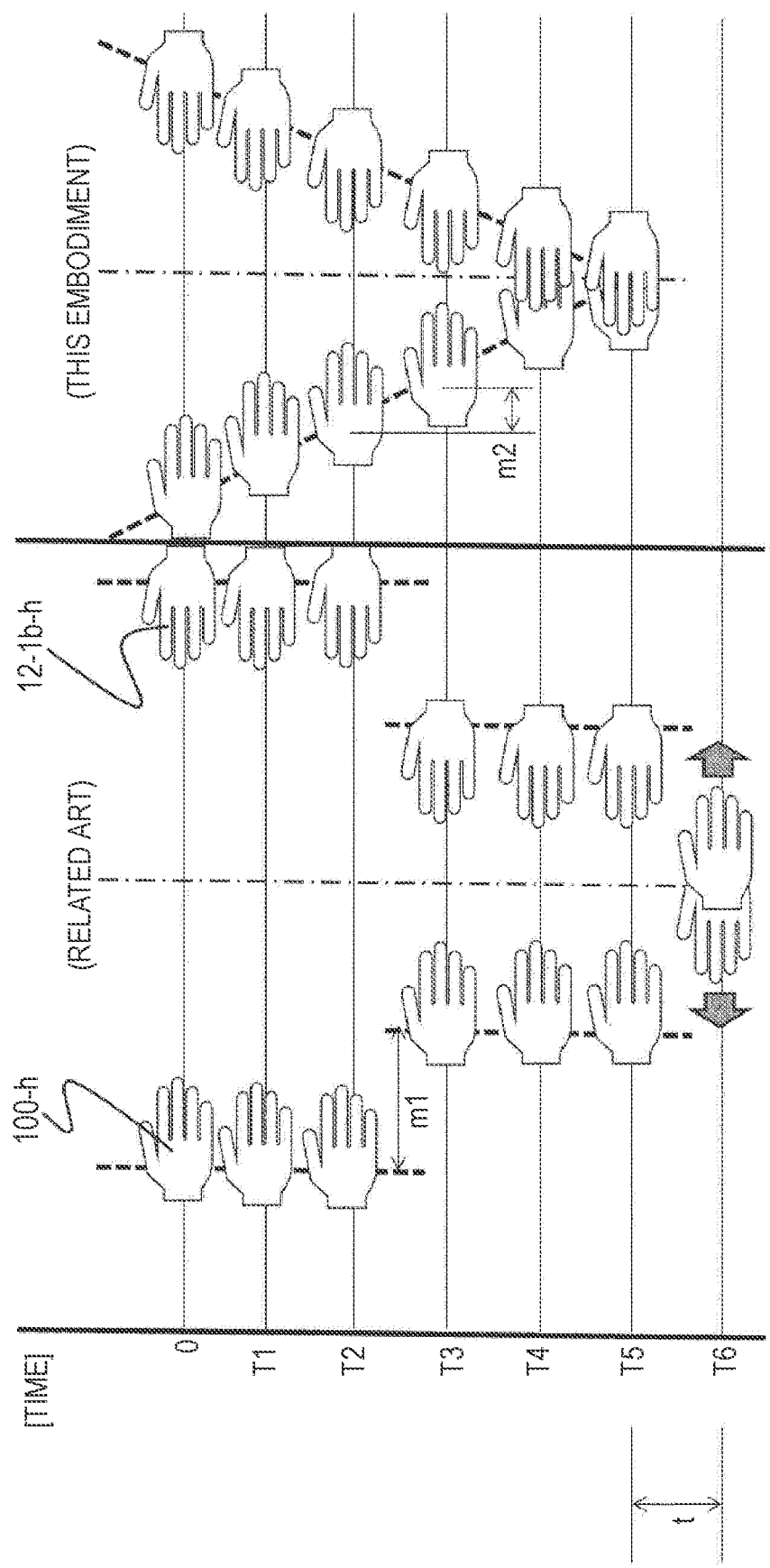
FIG. 14 is an explanatory diagram comparing the related art with the invention with respect to the details in a case where the avatars shake hands with each other.

FIG. 14 is an explanatory diagram comparing the related art with the invention with respect to the details in a case where the avatars shake hands with each other. FIG. 14 is a diagram describing a temporal transition of an operation in a case where handshake is performed as an action between the avatars, by comparing the related art with this embodiment.

An up-down direction of FIG. 14 represents a time transition, and a scale is described at a time interval t from 0 of the uppermost portion to times T1, T2, and T6. In both of the related art and this embodiment, a mode is described in which the hand 100-*h* of the viewer avatar and the hand 12-1*b*-*h* of the distributor avatar, the viewer avatar and the distributor avatar being the parties performing handshake, are close to each other along with the time transition.

In this embodiment, as a rendering result thereof, the hands 100-*h* and 12-1*b*-*h* are moved toward each other by a second movement amount m2 at every time according to the time interval t, and handshake is finally performed at a time T5.

On the other hand, in the related art, the data transmission rate (a transmission data amount per each unit time) used for drawing each of the avatars is approximately ⅓ of this embodiment, and as a result thereof, three times separated by the time interval t are rendered at the same position as that of the hands 100-*h* and 12-1*b*-*h*. After that, the rendering of the hands 100-*h* and 12-1*b*-*h* is performed by the hands 100-*h* and 12-1*b*-*h* proceeding by a first movement amount that is a movement amount of approximately 3 times the second movement amount m2, and is repeated afterward.

For this reason, in the related art, the rendered movement of the hands 100-*h* and 12-1*b*-*h* is rough, that is, a temporal granularity increases, and at the time T5, both of the hands 100-*h* and 12-1*b*-*h* do not reach a position for performing handshake, and at the next unit time T6, both of the hands 100-*h* and 12-1*b*-*h* pass by the position for performing handshake.

The description illustrated in FIG. 14 is premised on the fact that the viewer or the distributor performs an operation at a constant rate and prepares the motion data for moving the hand, and obviously, the viewer or the distributor is capable of setting the motion data to a different value by changing the rate of the operation for moving the hand while watching the display of the live content, but in the configuration of the related art, a temporal granularity of avatar rendering is rough, compared to this embodiment, and thus, the operability decreases, and the movement is more unnatural.

Figure 15:
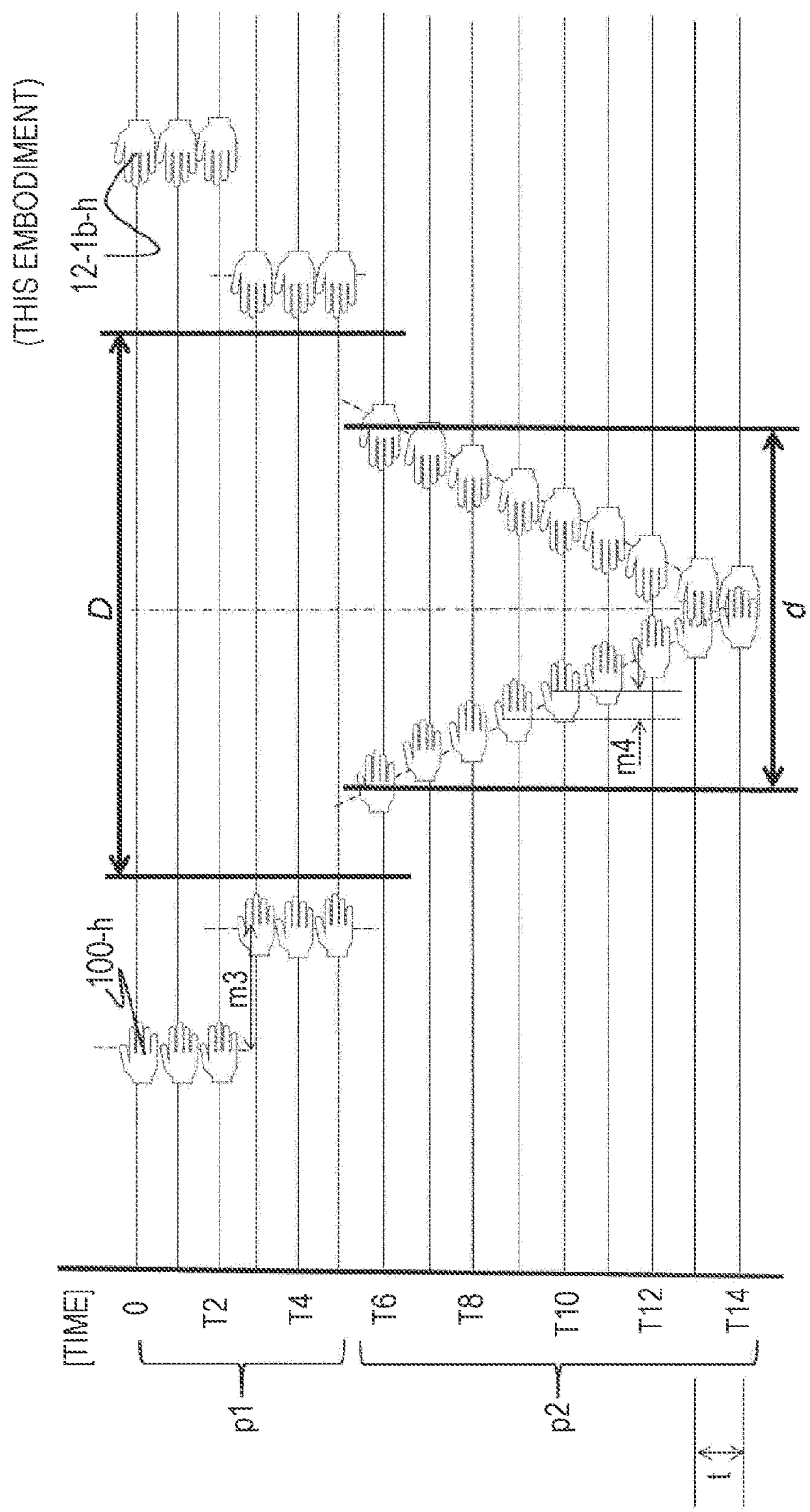
FIG. 15 is an explanatory diagram describing the details in a case where the avatars shake hands with each other, which is executed by the content distribution and reception system of the invention.

FIG. 15 is an explanatory diagram describing the details in a case where the avatars shake hands with each other, which is executed by the content distribution and reception system of the invention.

Figure 16:
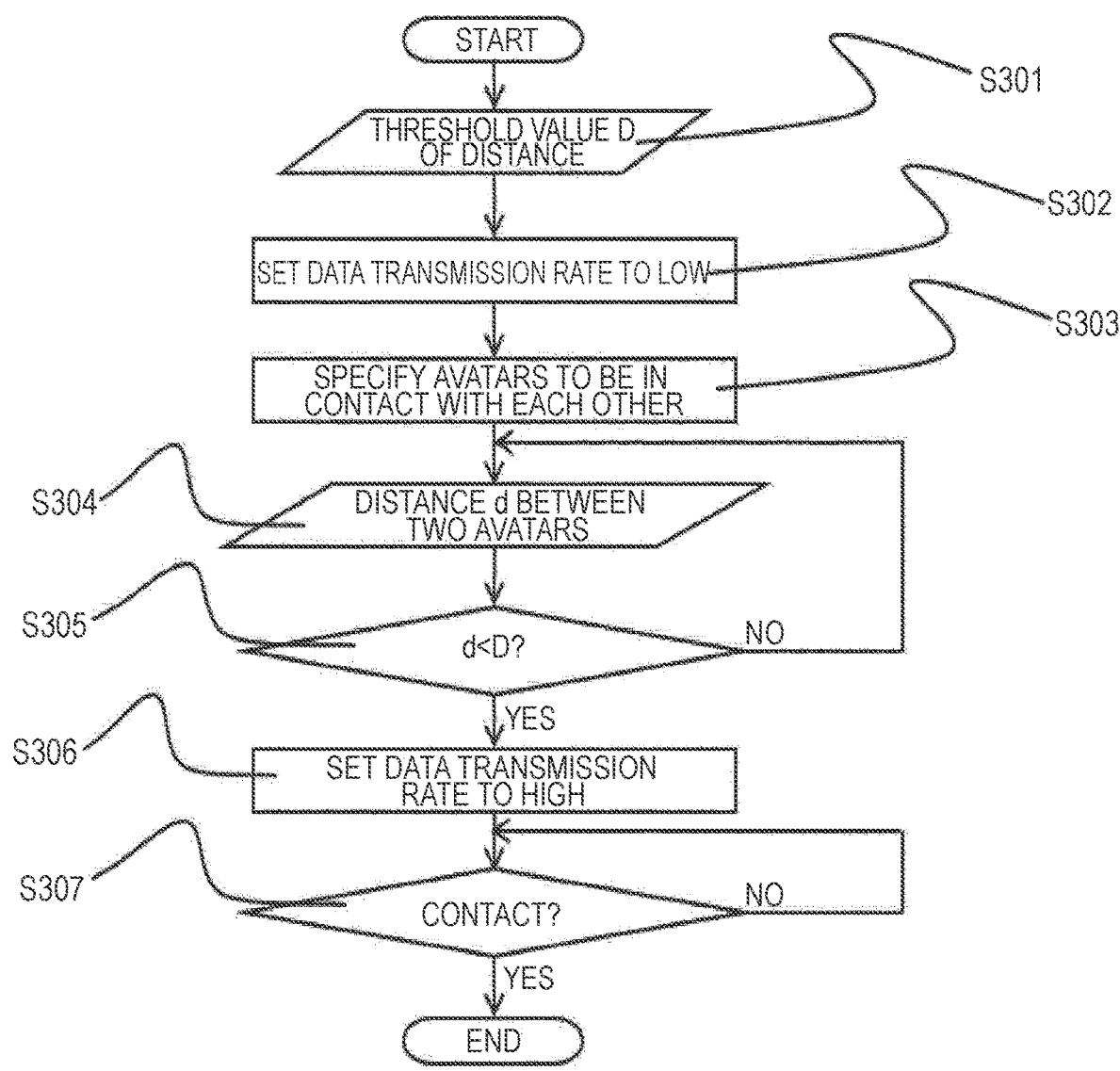
FIG. 16 is a flowchart describing a handshaking operation illustrated in FIG. 15.

FIG. 16 is a flowchart describing a handshaking operation illustrated in FIG. 15.

FIG. 15 illustrates an operation for performing handshake in this embodiment, in accordance with a time transition from when both of the hands 100-*h* and 12-1*b*-*h* are in positions separated from each other to when both of the hands 100-*h* and 12-1*b*-*h* are in the position for performing handshake, and the details will be described along with the relevant flowchart of FIG. 16.

Note that, characteristic control of this embodiment described here may be independently performed by a control unit provided in any of the distributor terminal 11, the viewer terminal 21, and the server 2, or may be performed in cooperation with the others, and in the following description, it is set that the control is executed by the control unit of the distributor terminal 11.

First, a threshold value D of a distance between both of the hands 100-*h* and 12-1*b*-*h* to be subjected to special control for the operation for performing handshake is set in advance, and thus, the distributor terminal 11 reads out the value from a memory of the distributor terminal 11 (step S301). The threshold value, for example, is a distance corresponding to 1 meter in the real space. Then, a rendering data transmission rate of the avatar is set to LOW that is a usual value, that is, a relatively low value (step S302).

Next, hands for performing handshake are specified to the hand 12-1*b*-*h* of the distributor avatar and the hand 100 of the viewer avatar (S303). The specification may be performed by the setting of the viewer who plans to perform handshake, according to an operation, or may be automatically performed by the system in the condition of the closest avatar or the like, from the situation of the virtual space 30. Next, the distributor terminal 11 calculates the specific distance between the hands by using a geometric method or the like, and insofar as a calculation result d is the threshold value D or more, the data transmission rate is set to LOW (steps S304 and S305).

In FIG. 15, in a time region p1 from the time 0 to the time T5, the calculated distance d is the threshold value D or more, and thus, movement rendering of the hands 100-*h* and 12-1*b*-*h* is temporally coarse, and movement is performed by a third movement amount m3 at every time 3 times the time t.

Then, in a case where the calculated value d is less than the threshold value D, the rendering data transmission rate is set to HIGH that is approximately 3 times higher (step S306), as a result thereof, in a time region p2 from the time T6 to a time T14, the hands 100-*h* and 12-1*b*-*h* are moved by a fourth movement amount that is approximately ⅓ of the third movement amount at every time t, a mutual contact operation can be easily performed, and finally at the time T14, the hands 100-*h* and 12-1*b*-*h* are in contact with each other, and handshake is performed (step S307).

In this embodiment, the configuration is as described above, and thus, when both of the avatars planning to perform handshake are in the positions separated from each other, the data transmission rate (a data transmission amount per unit time) used for rendering the avatar is comparatively small, and as a result thereof, a load on the system decreases. On the other hand, in a case where both of the avatars are close to each other to a position in which handshake is performed, the data transmission rate is increased such that the rendering is not unnatural, and thus, the operation for performing handshake is easily performed by operating the avatars. That is, a reduction in a load on the system and the easiness of a natural rendering result and an operation can be compatible.

Modification Example 1 to Arbitrary Properties of Disposition of Each Configuration In the above description of this embodiment, the rendering of the virtual object including each of the avatars was performed by a terminal of a user viewing the content, such as the viewer terminal used by the viewer. However, such a configuration is neither essential nor substantive for implementing the invention. That is, the rendering may be performed by a terminal performing distribution, a server, or various other terminals. In order to perform the rendering as described above, the specification data including the appearance of the virtual object and the motion data may be transmitted in advance to any one or both of a server and a terminal for performing the rendering.

Modification Example 2 to Various Relevant Display Modes

In order to further improve the effects of the invention in this embodiment described above, the following embodiments may be used or may be used by being suitably combined. Such embodiments are included in the invention.

Figure 17:
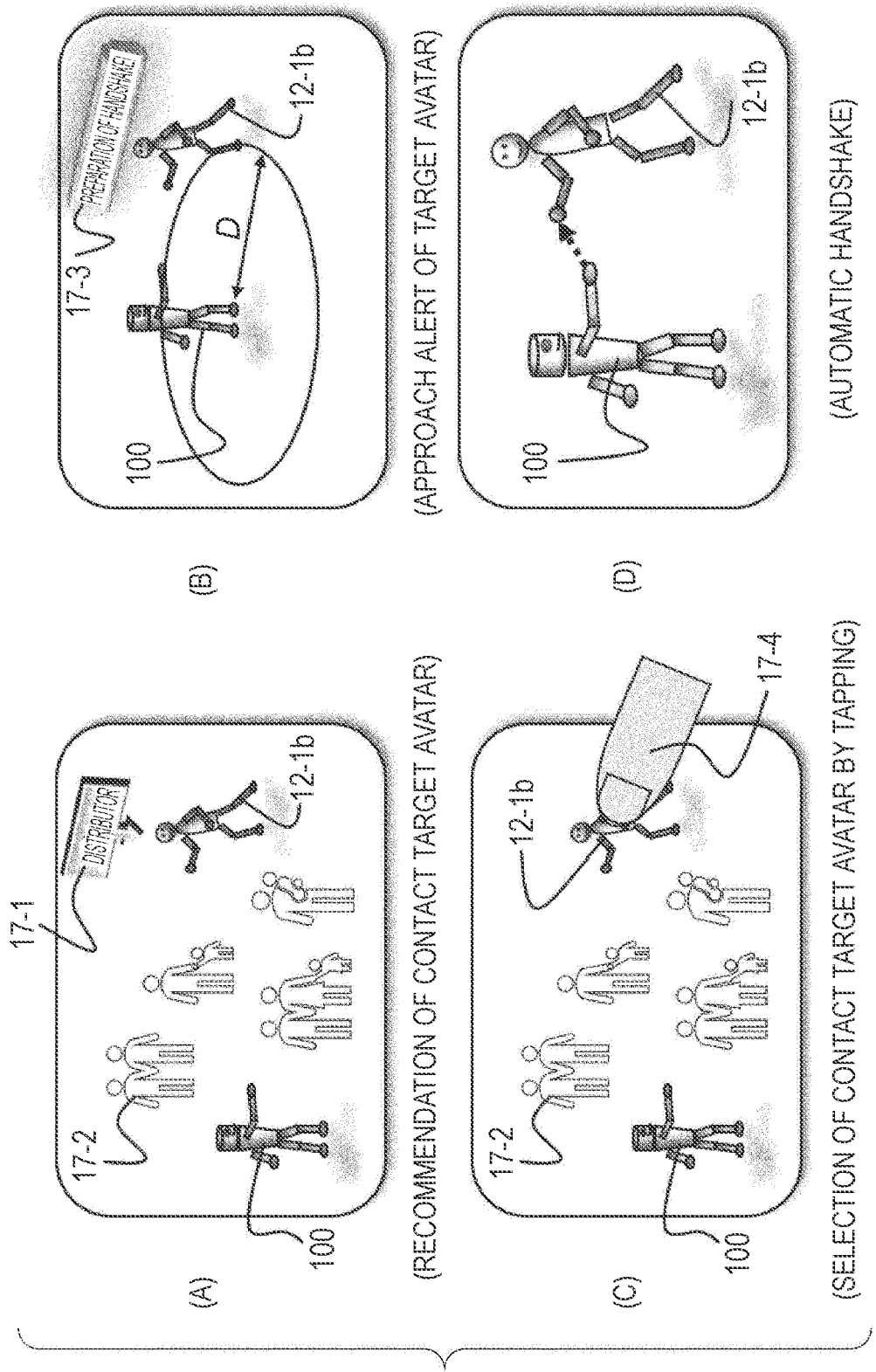
FIG. 17 is a schematic view illustrating various display modes, in the content distribution and reception system of the invention.

FIG. 17 is a schematic view illustrating various display modes, in the content distribution and reception system of the invention.

(a) Recommendation of Contact Target Avatar by System: The system may recommend the distributor avatar with respect to the viewer avatar, as a handshake target, or may recommend an avatar or the like that performed handshake in the past. FIG. 17(A) illustrates a flag 17-1 representing a recommendation on the distributor avatar 12-1b that is an avatar recommended as described above, and as a result thereof, the viewer viewing the live content is capable of easily distinctively recognizing the distributor avatar 12-1b from the other avatar 17-2.

(b) Approach Alert of Target Avatar: In a case where the other avatar for performing handshake is set by any method, and such a target avatar is closer than the threshold value D described above or the other distance, an alert 17-3 is displayed, and thus, the viewer is capable of preparing for the alert.

(c) Selection of Contact Target Avatar by Tapping: In a case where the viewer terminal is a smart phone, when selection is performed by touching, that is, tapping a touch sensor screen with a finger 17-4, as an operation for the viewer to select the other avatar for performing handshake, the operability is excellent. In a case where the viewer terminal is a personal computer, a mouse pointer or a keyboard may be used.

(d) Automatic Handshake: A contact action with the other avatar, such as handshake, brings the bodies into contact with each other in the final stage, and thus, requires a detailed operation, and the operability of a motion data preparing operation for moving the avatar is not excellent, compared to handshake in the real space. Therefore, in the final stage of the handshake, it is also considered that the system but not the operator performs an operation for automatically moving both of the hands to a hitting position or for moving both of the avatars together.

Modification Example 3 to Utilization in Content Other than Live Broadcast

In each of the embodiments described above, the description has been made on the premise of the fact that both of the avatars are operated by the operator, in the live content during the live broadcast. On the other hand, a system is proposed in which a virtual space content of a live broadcast is reproduced later, or participation with respect to the content as an avatar is performed later, in a reproduction-dedicated live content. In such a case, handshake or the like can be performed only by the operation of one avatar, and thus, the operation of the invention described above can be directly applied.

Modification Example 4 to Increase and Decrease Control of Data Distribution Interval According to Distance Between Avatars In each of the examples described above, it has been described that in a case where a plurality of avatars are close to each other, and for example, an operation such as handshake is performed, control is performed such that a transmission time interval of the rendering data of the avatar decreases in accordance with a distance from far to near.

On the other hand, in a case where such avatars are separated from each other after performing or not performing handshake, control may be performed such that the transmission time interval of the rendering data of the avatar increases in accordance with a distance. That is, control is performed such that the transmission time interval of the rendering data of the avatar is changed in accordance with a distance between the avatars, in other words, control is performed such that a transmission amount per unit time of the rendering data of the avatar, that is, a transmission rate is changed in accordance with the distance. According to such a configuration, moving image distribution with a reduced line load of the system, no data transmission failure, and improved realtime properties may be performed.

[Modification Property 5 to Control According to Mutual Distance in Plurality of Undesignated Avatars]

Similarly, in the above description, for example, a configuration has been described in which avatars performing an action such as handshake are set or designated in advance, and a distribution interval time of the rendering data is controlled by measuring a distance between the designated avatars.

On the other hand, for example, a distance in all avatars in a virtual reality space is continuously measured, and in a case where any interval is less than a threshold value, control may be performed such that a data transmission interval decreases, and in a case where any interval is greater than the threshold value, control may be performed such that the data transmission interval increases, without being limited to such a configuration.

According to such a configuration, there is a case where handshake between the avatars unexpectedly (compulsively) occurs, and in such a case, handling is also performed, and there is a merit for the operator of each of the avatars that the troublesomeness of an operation for designating avatars to be in contact with each other is allowed to be eliminated.

Note that, in each of the examples described above, as the control of the transmission data amount in order for the avatar rendering, a respect that a timing interval for transmitting data is decreased, in other words, can be described as a respect that the transmission amount of the data per unit time is increased, and on the contrary, a respect that the timing interval for transmitting the data is increased, in other words, can be described as a respect that the transmission amount of the data per unit time is decreased. In other words, control is performed such that the transmission amount of the rendering data of the avatar per unit time, that is, the transmission rate is changed in accordance with the distance between the avatars. Such respects are common in each of the examples.

In the live content targeting at the virtual space, when the action for the avatars to be in contact with each other is performed, for example, both of the avatars for performing handshake are in the positions separated from each other, the data transmission rate (the data transmission amount per unit time) used for rendering the avatar is comparatively small, and as a result thereof, a load on the system decreases.

On the other hand, in a case where both of the avatars are close to each other to a position in which handshake is performed, the data transmission rate is increased such that the rendering is not unnatural, and thus, the operation for performing handshake can be easily performed by operating the avatars. That is, a reduction in a load on the system and the easiness of the natural rendering result and the operation can be compatible.

The invention can be implemented in various other forms, and various omissions, substitutions, and changes can be made within a range not departing from the gist of the invention. The embodiments and modifications thereof are included in the scope of the invention described in the claims and the equivalent scope thereof, as well as in the scope and gist of the invention.

REFERENCE SIGNS LIST

1 Content distribution and reception system
2 Content distribution server
2a Input/output interface
2b Control unit
2c Content information storage unit
2d Content distribution unit
2f Program storage unit
2g User management unit
2i Bus line
3 Internet communication network
9-1 Appearance data of avatar
9-2 Motion data of avatar (data of operation, information of operation)
9-2a Joint of motion data
9-2b Ramus of motion data
9-3 Rendering data of avatar
11 Distributor terminal
11a Input/output interface
11b Control unit
11c Avatar operation unit
11e Rendering unit
11f Display unit
11g Operation unit
11h Program storage unit
11i Data storage unit
11k Comment posting unit
11m Bus line
12 First viewer terminal
12a Input/output interface
12b Control unit
12c Avatar operation unit
12e Item posting unit
12f Display unit
12g Operation unit
12h Program storage unit
12i Data storage unit
12k Comment posting unit
12m Bus line
12-1 Display panel
12-1a Moving image display area
12-1b Avatar of first distributor
12-1c Avatar of first viewer
12-1d Ribbon-type virtual object
12-1e Home button display
12-1f Stop button display
12-1g Pause button display
12-1h Reproduction button display
12-1i Comment posting button display
12-1k Seek bar display
12-1m Seek button display
12-1n Tree
12-1o House
12-1r Comment
12-2 Mouse cursor
12-3 Mouse pointer
12-4 Keyboard
22 Second viewer terminal
30 Virtual space
31 Background
32 Virtual camera
100 Viewer avatar

The invention claimed is:

1. An avatar display system in a virtual space for attaining computer graphic animation display of each avatar including a contact operation between the avatars on a display screen of each of a plurality of terminals by allowing users of the plurality of terminals connected through a communication line to share a three-dimensional virtual space, by allowing the avatar symbolizing each of the users to appear in the three-dimensional virtual space, and by distributing rendering data of the avatar including motion data to each of the plurality of terminals from a distribution unit,
wherein the avatar display system in the virtual space further comprises a distance information generating unit generating mutual distance information of each of the avatars in the three-dimensional virtual space, and a control unit provided in the avatar display system is configured such that an information amount per unit time of the distribution of the rendering data of the avatar including the motion data that is performed by the distribution unit is changed by changing a transmission interval for transmitting the motion data to the plurality of terminals from the distribution unit, in accordance with the generated mutual distance information,
wherein the control unit controls the information amount such that in a case where the generated mutual distance of the avatars is less than a threshold value set in advance, the information amount per unit time of the distribution is increased.

2. The avatar display system in the virtual space according to claim 1, wherein at least one of the plurality of terminals includes a selection unit selecting a target avatar for generating the mutual distance information.

3. An avatar display method in a virtual space for attaining computer graphic animation display of each avatar including a contact operation between the avatars on a display screen of each of a plurality of terminals by comprising a step of allowing users of the plurality of terminals connected through a communication line to share a three-dimensional virtual space, of allowing the avatar symbolizing each of the users to appear in the three-dimensional virtual space, and of allowing a distribution unit to distribute rendering data of the avatar including motion data to each of the plurality of terminals,
wherein the avatar display method in the virtual space further comprises a step of allowing a distance information generating unit to generate mutual distance information of each of the avatars in the three-dimensional virtual space, and a control unit provided in the system is configured such that an information amount per unit time of the distribution of the rendering data of the avatar including the motion data that is executed in the distribution step is changed by changing a transmission interval for transmitting the motion data to the plurality of terminals from the distribution unit, in accordance with the generated mutual distance information,
wherein the control unit controls the information amount such that in a case where the generated mutual distance of the avatars is less than a threshold value set in advance, the information amount per unit time of the distribution is increased.

4. The avatar display method in the virtual space according to claim 3, wherein the avatar display method further comprises a step of allowing a selection unit provided in at least one of the plurality of terminals to select a target avatar for generating the mutual distance information.

5. A non-transitory computer-readable medium encoded with a computer program for allowing a computer to execute each of the steps of the avatar display method in the virtual space according to claim 3.

* * * * *